United States Patent
Lamm et al.

Patent Number: 5,623,060
Date of Patent: Apr. 22, 1997

[54] DYE MIXTURE CONTAINING AT LEAST FOUR DIAZO DYES HAVING THE SAME COLOR WITH A DIAMINOPYRIDINE COUPLING COMPONENT

[75] Inventors: Gunther Lamm, Hassloch; Hermann Loeffler, Speyer; Helmut Reichelt, Neustadt, all of Germany

[73] Assignee: BASF Aktiengesellschaft, Ludwigshafen, Germany

[21] Appl. No.: 596,142
[22] PCT Filed: Aug. 25, 1994
[86] PCT No.: PCT/EP94/02823
§ 371 Date: Feb. 20, 1996
§ 102(e) Date: Feb. 20, 1996
[87] PCT Pub. No.: WO95/07318
PCT Pub. Date: Mar. 16, 1995

[30] Foreign Application Priority Data

Sep. 4, 1993 [DE] Germany .................. 43 29 915.6

[51] Int. Cl.$^6$ .................. C09B 67/22; C09B 29/42; C09B 31/153; C09B 56/12; D06P 1/18
[52] U.S. Cl. .................. 534/573; 8/639; 534/655; 534/765; 534/768; 534/773
[58] Field of Search .................. 534/573 M, 765, 534/768, 655; 8/639

[56] References Cited

FOREIGN PATENT DOCUMENTS

| | | | |
|---|---|---|---|
| 0147783 | 7/1985 | European Pat. Off. | 534/573 M |
| 0378167 | 7/1990 | European Pat. Off. | 534/573 M |
| 0548715 | 6/1993 | European Pat. Off. | 534/573 M |
| 0569785 | 11/1993 | European Pat. Off. | 534/573 M |
| 3505899 | 8/1986 | Germany | 534/573 M |
| 4142192 | 6/1993 | Germany | 534/573 M |
| 0532913 | 6/1993 | Japan | 534/573 M |
| 2174406 | 11/1986 | United Kingdom | 534/573 M |

*Primary Examiner*—Floyd D. Higel
*Attorney, Agent, or Firm*—Oblon, Spivak, McClelland, Maier & Neustadt, P.C.

[57] ABSTRACT

Dye mixtures comprising at least 4 dyes of the same color having the formula

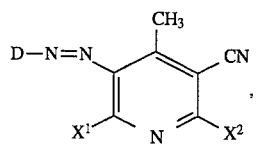

where
D is the radical of a diazo component of the aminoanthraquinone, aniline, aminothiophene, aminothiazole, aminoisothiazole, aminothiadiazole or aminobenzisothiazole series,
one of X1 and X2 is substituted or unsubstituted phenylamino while the other is a radical of the formula NH—L—O—R, where L is substited or unsubstituted $C_2$–$C_8$-alkylene, and
R is hydrogen, $C_1$–$C_4$ or $C_1$–$C_3$-alkanoyl,
are useful for dyeing or printing textile materials.

14 Claims, No Drawings

DYE MIXTURE CONTAINING AT LEAST FOUR DIAZO DYES HAVING THE SAME COLOR WITH A DIAMINOPYRIDINE COUPLING COMPONENT

This application is a 371 of PCT/EP94/02823 filed Aug. 25, 1994.

BACKGROUND OF THE INVENTION

1. Field of the Invention

The present invention relates to a dye mixture containing at least four azo dyes having the same color with a diaminopyridine coupling component.

2. Description of the Background

EP-A-548,715 and JP-A-32913/1999 disclose dye mixtures with similar blending patterns. However, these prior art dyes still have application defects. In particular, a pronounced temperature dependence of the exhaustion characteristics of the dyes is noted as well as an inadequate degree of exhaustion.

SUMMARY OF THE INVENTION

In accordance with the present invention, a dye mixture is provided which overcomes the disadvantages of the prior art dyes, which mixture contains at least four azo dyes having the same color with a diaminopyridine coupling component.

DETAILED DESCRIPTION OF THE PREFERRED EMBODIMENTS

The present invention provides a dye mixture containing at least four azo dyes having the same color with a diaminopyridine coupling component, each dye having the formula Ia and Ib.

DESCRIPTION

The present invention relates to novel dye mixtures comprising at least 4 dyes of the same color having the formulae Ia and Ib

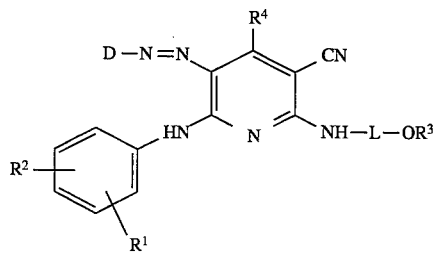

(Ia)

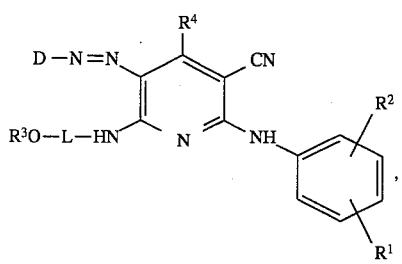

(Ib)

where

D is the radical of a diazo component of the aminoanthraquinone, aniline, aminothiophene, aminothiazole, aminoisothiazole, aminothiadiazole or aminobenzisothiazole series, L is $C_2$–$C_8$-alkylene, which may be interrupted by 1 or 2 oxygen atoms in ether function, $R^1$ and $R^2$ are independently of each other hydrogen, $C_1$–$C_4$-alkyl, $C_1$–$C_4$-alkoxy or halogen, $R^3$ is hydrogen, $C_1$–$C_4$-alkyl or $C_1$–$C_3$-alkanoyl, and $R^4$ is hydrogen or $C_1$–$C_4$-alkyl, and to the use thereof for dyeing or printing textile materials.

EP-A-548 715 and JP-A-32913/1993 disclose dye mixtures with similar blending partners.

However, it has been found that the prior art dyes still have application defects. These are in particular a pronounced temperature dependence of the exhaustion characteristics of the dyes and an inadequate degree of exhaustion.

It is an object of the present invention to provide novel dye mixtures which shall be free of the abovementioned defects.

We have found that this object is achieved by the dye mixtures more particularly described at the beginning.

Any alkyl or alkylene appearing in the dye components of the abovementioned dye mixtures can be not only straight-chain but also branched.

In substituted alkyl appearing in the dye components the number of substituents is generally 1 or 2.

In substituted phenyl appearing in the dye components the number of substituents, unless otherwise stated, is generally from 1 to 3, preferably 1 or 2.

Preference is given to dye mixtures of the invention where D is 1-anthraquinonyl or a radical of the formula

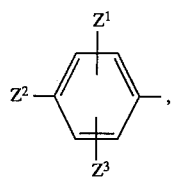

(IIa)

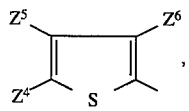

(IIb)

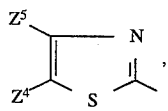

(IIc)

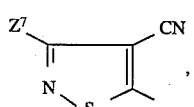

(IId)

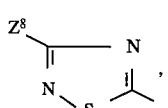

(IIe)

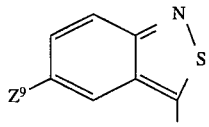
(IIf)

or

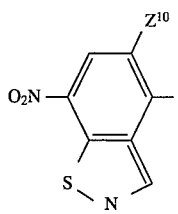
(IIg)

where $Z^1$ is hydrogen, nitro, cyano, chlorine, bromine, $C_1$–$C_4$-alkoxycarbonyl, phenylsulfonyl, phenoxysulfonyl or $C_1$–$C_4$-dialkylsulfamyl, $Z^2$ is hydrogen, nitro or unsubstituted or $C_1$–$C_4$-alkyl-, $C_1$–$C_4$-alkoxy-or chlorine-substituted phenylazo, $Z^3$ is hydrogen, cyano, chlorine, bromine, $C_1$–$C_4$-alkoxycarbonyl, phenylsulfonyl, phenoxysulfonyl or $C_1$–$C_4$-dialkylsulfamyl, $Z^4$ is cyano, formyl, $C_1$–$C_4$-alkoxycarbonyl, phenylcarbamoyl, unsubstituted or $C_1$–$C_4$-alkyl-substituted phenylazo or a radical of the formula

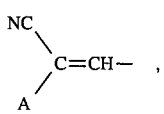

where A is cyano or $C_1$–$C_4$-alkoxycarbonyl, $Z^5$ is hydrogen, $C_1$–$C_4$-alkyl, $C_1$–$C_4$-alkoxy, phenyl which may be methyl-, methoxy-, chlorine- or $C_1$–$C_4$-alkoxycarbonyl-substituted, chlorine, bromine, $C_1$–$C_4$-alkoxycarbonyl or $Z^4$ and $Z^5$ together are an unsubstituted or methoxy-, thiocyanato- or $C_1$–$C_4$-alkylsulfonyl-substituted benzo radical, $Z^6$ is cyano or $C_1$–$C_4$-alkoxycarbonyl, $Z^7$ $C_1$–$C_4$-alkyl which may be $C_1$–$C_4$-alkoxy- or phenoxy-substituted, phenyl which may be methyl-, methoxy- or chlorine-substituted, benzyl which may be methyl-, methoxy- or chlorine-substituted, thienyl or cyano, $Z^8$ is phenyl or cyano- or $C_1$–$C_4$-alkoxycarbonyl-substituted ethylthio, $Z^9$ is hydrogen, nitro or cyano, and $Z^{10}$ is hydrogen, chlorine, bromine, nitro or cyano.

When D is a radical of the formula IIa, preference is given to those dyes in which at least one of the radicals $Z^1$, $Z^2$ and $Z^3$ is not hydrogen.

$R^1$, $R^2$, $R^3$, $R^4$, $Z^5$ and $Z^7$ are each for example methyl, ethyl, propyl, isopropyl, butyl, isobutyl or sec-butyl.

$Z^1$, $Z^3$, $Z^4$, $Z^6$, $Z^8$ and A as well as $Z^5$ are each for example methoxycarbonyl, ethoxycarbonyl, propoxycarbonyl, isopropoxycarbonyl, butoxycarbonyl, isobutoxycarbonyl or sec-butoxycarbonyl.

$Z^1$ and $Z^3$ may also be for example dimethylsulfamyl, diethylsulfamyl, dipropylsulfamyl, diisopropylsulfamyl or dibutylsulfamyl.

$R^3$ may also be for example formyl, acetyl or propionyl.

$R^1$, $R^2$ and $Z^5$ may each also be for example methoxy, ethoxy, propoxy, isopropoxy, butoxy, isobutoxy or sec-butoxy.

$R^1$ and $R^2$ may each also be for example fluorine, chlorine or bromine.

$Z^5$ and $Z^7$ may each also be for example phenyl, 2-, 3- or 4-methylphenyl, 2,4-dimethylphenyl, 2-, 3- or 4-methoxyphenyl, 2,4-dimethoxyphenyl, 2-, 3- or 4-chlorophenyl, 2,4-dichlorophenyl, 2-methyl-4-chlorophenyl, 2-methyl-4-methoxyphenyl.

$Z^7$ may each also be for example benzyl, 2-, 3- or 4-methylbenzyl, 2-, 3- or 4-methoxybenzyl, 2-, 3- or 4-chlorobenzyl, methoxymethyl, ethoxymethyl, phenoxymethyl, 2-methoxyethyl, 2-ethoxyethyl or 2-phenoxyethyl.

$Z^4$ may each also be for example phenylazo or 2-, 3- or 4-methylphenylazo.

$Z^8$ is for example 2-cyanoethylthio, 2-methoxycarbonylethylthio or 2-ethoxycarbonylethylthio.

L is for example $(CH_2)_2$, $(CH_2)_3$, $(CH_2)_4$, $(CH_2)_5$, $(CH_2)_6$, $(CH_2)_7$, $(CH_2)_8$, $CH(CH_3)CH_2$, $CH(CH_3)CH(CH_3)$, $(CH_2)_2O(CH_2)_2$, $(CH_2)_2O(CH_2)_3$, $(CH_2)_3O(CH_2)_3$, $(CH_2)_3O(CH_2)_4$, $(CH_2)_4O(CH_2)_4$, $CH(CH_3)CH_2OCH_2CH(CH_3)$ or $(CH_2)_2O(CH_2)_2O(CH_2)_2$.

Preference is further given to dye mixtures of the invention comprising from 4 to 8 dyes of the formulae Ia and Ib which have the same color.

Preference is further given to dye mixtures of the invention which always contain dyes of the formulae Ia and Ib where $R^3$ in both the formulae is at one and the same time hydrogen and $C_1$–$C_3$-alkanoyl.

Preference is further given to dye mixtures of the invention where $R^4$ is methyl.

Particular preference is given to dye mixtures of the invention where D is 1-anthraquinonyl or a radical of the formula IIa, IIb, IIc or IId.

Particular preference is further given to dye mixtures of the invention where $R^3$ is hydrogen, $C_1$–$C_4$-alkyl or $C_1$–$C_2$-alkanoyl and L is $C_3$–$C_8$-alkylene which is interrupted by 1 or 2 oxygen atoms in the ether function.

Very particular preference is given to dye mixtures of the invention wherein L is a radical of the formula $(CH_2)_2$, $(CH_2)_3$, $(CH_2)_2O(CH_2)_2$, $(CH_2)_2O(CH_2)_3$, $(CH_2)_3O(CH_2)_3$, $(CH_2)_3O(CH_2)_4$ or $(CH_2)_3O(CH_2)_2O(CH_2)_2$.

Very particular preference is further given to dye mixtures of the invention where $R^3$ is hydrogen, $C_1$–$C_2$-alkyl or formyl.

Very particular preference is further given to dye mixtures of the invention where $R^3$ is formyl or a mixture of formyl and acetyl in a molar ratio of from 1:9 to 9:1.

Preference is given to dye mixtures which, in each case based on the weight of the dyes, contain from 10 to 35% by weight, preferably from 15 to 30% by weight, of one or more dyes of the formula Ia and from 65 to 90% by weight, preferably from 70 to 85% by weight, of one or more dyes of the formula Ib.

When $R^3$ is hydrogen and $C_1$–$C_3$-alkanoyl at one and the same time in both the formulae Ia and Ib, preference is given to those mixtures which, in each case based on the weight of the dyes, contain from 50 to 96% by weight, preferably from 75 to 85% by weight, of dyes of the formulae Ia and Ib wherein $R^3$ is in each case $C_1$–$C_3$-alkanoyl and from 4 to 50% by weight, preferably from 15 to 25% by weight, of dyes of the formulae Ia and Ib wherein $R^3$ is in each case hydrogen.

The novel dye mixtures are advantageously obtainable by dissolving a mixture of the coupling components of the formulae IIIa and IIIb

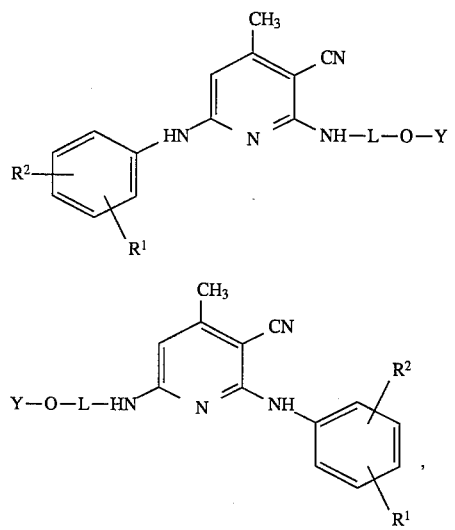

where L, $R^1$ and $R^2$ are each as defined above and Y is in each case hydrogen or $C_1$–$C_4$-alkyl, preferably in each case hydrogen or in both the formulae simultaneously hydrogen and $C_1$–$C_4$-alkyl, in water-free or water-containing formic acid, acetic acid, propionic acid or mixtures thereof and treating this mixture with a diazonium salt derived from an amine of the formula IV

where D is as defined above.

As the coupling components are dissolved in the carboxylic acids mentioned, some of the free hydroxyl groups undergo esterification.

Depending on the sensitivity of the diazonium salt, either the solution of components IIIa and IIIb in said carboxylic acids can be introduced into the suspension of the diazonium salt solution in ice and water, in which case the coupling reaction can be speeded up with bases, e.g. sodium hydroxide solution or sodium acetate or formate, or alternatively the diazonium salt solution can be added to the cooled mixture of the coupling components, in which case a base has to be added to set a pH from about 0 to 2.

Preferably the coupling components are dissolved in formic acid, acetic acid or a mixture thereof.

Particularly preferably the coupling components are dissolved in formic acid, in particular in formic acid from 50 to 99% strength by weight.

The mixtures of coupling components IIIa and IIIb are generally compounds known per se. They can be obtained for example by the methods described in DE-A-4 142 192.

The novel dye mixtures are advantageously suitable for dyeing or printing textile materials. These are for example fibers or fabrics, in particular from polyesters, but also from cellulose esters or polyamides, or blend fabrics from polyesters and cellulose fibers or wool.

The dye mixtures of the invention have virtually temperature-independent exhaustion characteristics. They also dye to a high degree of exhaustion.

The Examples which follow illustrate the invention. The percentages of the compositions of the dye mixtures are by weight.

EXAMPLE 1

163 g of 2-amino-5-nitrobenzonitrile were diazotized with 305 g of nitrosylsulfuric acid in a conventional manner in a medium acidified with sulfuric acid. The reaction mixture was run into 2500 g of ice and excess nitrous acid was destroyed with amido-sulfuric acid. The resulting solution was run with stirring into a cooled mixture of 265.2 g of the coupling component of the formula

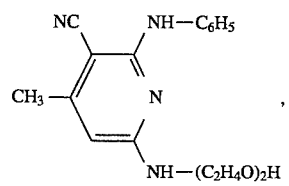

46.8 g of the coupling component of the formula

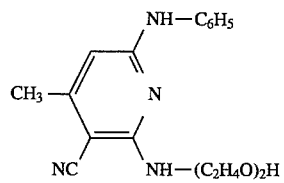

and 700 ml of 85% strength by weight formic acid, the mixture having been stirred overnight beforehand. Then 200 ml of acetic acid were added in the cold. During the addition of the diazonium solution to the coupling components the temperature of the reaction mixture was maintained at <8° C. by addition of ice and the batch was also kept stirrable by addition of cold water. The batch was subsequently stirred at from 0° to 8° C. for 30 min, at which point the sodium hydroxide solution was added to set a pH of 1.5. The batch was heated to 80°–90° C. and the dye mixture was isolated to yield (after drying) 503 g of a dark red powder containing the four dyes in the stated proportions:

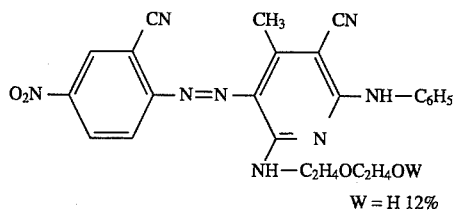

W = H 12%
CHO 68%

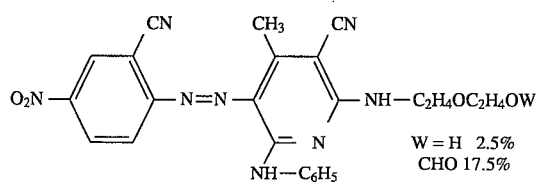

W = H 2.5%
CHO 17.5%

0.35 g portions of the dye mixture were applied to polyester fabric at 120° and 130° C. in the course of 60 min by the HT dyeing process. At 120° C. the exhaustion of the dye mixture was about 90% and at 130° C. was about 95%. The dyeings obtained had a bright bluish red hue.

EXAMPLE 2

188 g of a mixture of the compounds of the formulae

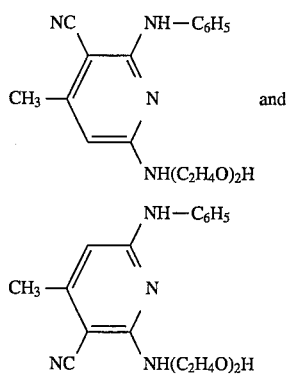

(Mixing ratio 85:15) and 107.5 g of a mixture of the compounds of the formulae

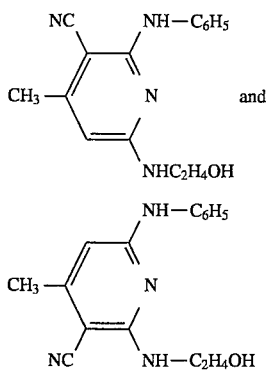

(Mixing ratio 85:15) were dissolved in 700 ml of 85% strength by weight formic acid and stirred for 12 h. The resulting mixture was then added to a diazonium salt solution of 2-amino-5-nitrobenzonitrile (1 mol), which had been prepared as described in Example 1, and coupling was carried out as described in Example 1. The result was a dye mixture containing the following components:

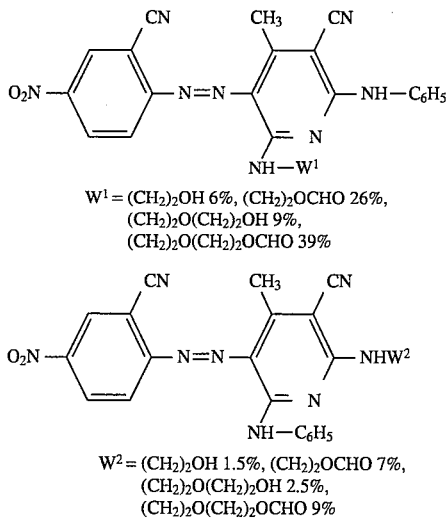

$W^1 = (CH_2)_2OH$ 6%, $(CH_2)_2OCHO$ 26%,
$(CH_2)_2O(CH_2)_2OH$ 9%,
$(CH_2)_2O(CH_2)_2OCHO$ 39%

$W^2 = (CH_2)_2OH$ 1.5%, $(CH_2)_2OCHO$ 7%,
$(CH_2)_2O(CH_2)_2OH$ 2.5%,
$(CH_2)_2O(CH_2)_2OCHO$ 9%

Polyester fabric was dyed in a bright bluish red hue.

EXAMPLE 3

312 g of the mixture of coupling components mentioned in Example 1 were heated in 800 ml glacial acetic acid and 10 g of toluenesulfonic acid at 115° C. for 8 h. The mixture was then cooled down and coupled as described in Example 1.

The isolated dye mixture comprised 520 g of a dark red powder containing the following components:

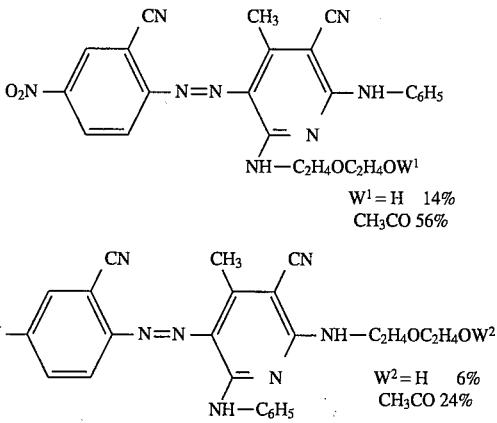

$W^1 = H$ 14%
$CH_3CO$ 56%

$W^2 = H$ 6%
$CH_3CO$ 24%

The dye mixture obtained goes very readily onto polyester fabric at 130° C. The dyeings obtained have a bright bluish red hue.

EXAMPLE 4

Example 1 was repeated to prepare the following dye mixture:

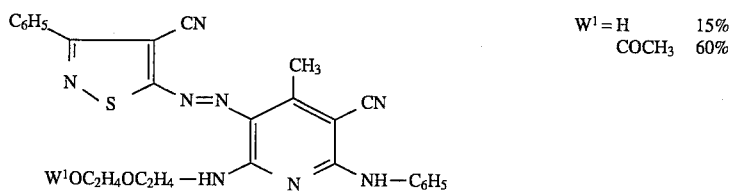

| | | |
|---|---|---|
| $W^1 =$ H | | 15% |
| | $COCH_3$ | 60% |

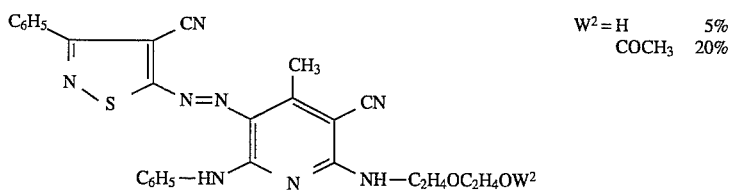

| | | |
|---|---|---|
| $W^2 =$ H | | 5% |
| | $COCH_3$ | 20% |

0.35 g of this mixture was applied at 120° and 130° C. to a polyester fabric by the HT process in the course of 60 min each time. The dyeings obtained were almost equal in color strength and had a red hue. The dyebaths were almost completely exhausted.

EXAMPLE 5

Example 1 was repeated to prepare the following dye mixture:

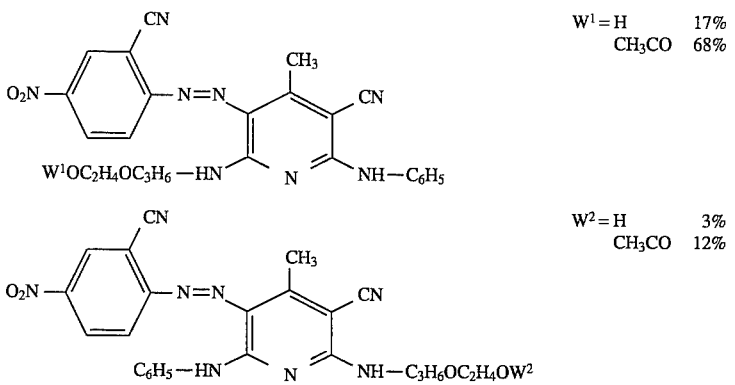

| | | |
|---|---|---|
| $W^1 =$ H | | 17% |
| | $CH_3CO$ | 68% |

| | | |
|---|---|---|
| $W^2 =$ H | | 3% |
| | $CH_3CO$ | 12% |

0.35 g of this mixture was applied at 120° and 130° C. to a polyester fabric by the HT process in the course of 60 min each time. The dyeings obtained were almost equal in color strength and had a bluish red hue. The dyebaths were almost completely exhausted.

The same method yields the below-tabulated dyes. They give similar dyeing results.

TABLE 1

Structure: D—N=N— [pyridine ring with CH3, CN, Q¹—HN, NH—Q² substituents]

Q¹ = U 80%
C$_6$H$_5$ 20%

Q² = U 20%
C$_6$H$_5$ 80%

| Ex. No. | D | U | | Hue on polyester |
|---|---|---|---|---|
| 6 | C$_6$H$_5$CH$_2$-substituted isothiazole with CN | C$_2$H$_4$OC$_2$H$_4$OCHO<br>C$_2$H$_4$OC$_2$H$_4$OH | 75%<br>25% | yellowish red |
| 7 | C$_6$H$_5$CH$_2$-substituted isothiazole with CN | C$_3$H$_6$OC$_2$H$_4$OCH$_3$<br>C$_3$H$_6$OCHO<br>C$_3$H$_6$OH | 85%<br>12%<br>3% | yellowish red |
| 8 | 2-methyl-4-chloro-5-nitro-benzonitrile group (O$_2$N, Cl, CN on benzene) | C$_3$H$_6$OC$_2$H$_4$OCH$_3$<br>C$_3$H$_6$OCH$_3$ | 85%<br>15% | bordeaux |
| 9 | thiophene-substituted isothiazole with CN | C$_2$H$_4$OC$_2$H$_4$OCHO<br>C$_2$H$_4$OC$_2$H$_4$OH | 75%<br>25% | red |
| 10 | thiophene-substituted isothiazole with CN | C$_3$H$_6$OC$_2$H$_4$OCH$_3$<br>C$_3$H$_6$OCH$_3$ | 85%<br>15% | red |
| 11 | CH$_3$, NC-substituted thiophene with CN | C$_3$H$_6$OC$_2$H$_4$OCH$_3$<br>C$_3$H$_6$OCH$_3$ | 85%<br>15% | bordeaux |
| 12 | CH$_3$, NC-substituted thiophene with CN | C$_2$H$_4$OC$_2$H$_4$OCOCH$_3$<br>C$_2$H$_4$OC$_2$H$_4$OH<br>C$_2$H$_4$OCHO<br>C$_2$H$_4$OH | 50%<br>20%<br>25%<br>5% | bordeaux |
| 13 | phenyl-N=N-phenyl- | C$_3$H$_6$OC$_2$H$_4$OCH$_3$<br>C$_3$H$_6$OCHO<br>C$_3$H$_6$OH | 80%<br>16%<br>4% | orange |
| 14 | phenyl-N=N-(3-chlorophenyl)- | C$_3$H$_6$OC$_2$H$_4$OCH$_3$<br>C$_3$H$_6$OCHO<br>C$_3$H$_6$OH | 80%<br>16%<br>4% | yellowish red |
| 15 | O$_2$N-substituted benzisothiazole | C$_3$H$_6$OC$_2$H$_4$OCH$_3$<br>C$_3$H$_6$OC$_4$H$_8$OCHO<br>C$_3$H$_6$OC$_4$H$_8$OH | 45%<br>44%<br>11% | reddish blue |

TABLE 1-continued $$Q^1\text{-HN} \underset{N}{\overset{D-N=N}{\bigcirc}} \text{NH-}Q^2$$

with CH₃ and CN substituents on pyridine ring

Q¹ = U  80%
    C₆H₅ 20%

Q² = U  20%
    C₆H₅ 80%

| Ex. No. | D | U | | Hue on polyester |
|---|---|---|---|---|
| 16 | 6-nitro-2,1-benzisothiazol-3-yl | C₃H₆OC₂H₄OC₂H₅<br>C₃H₆OCOCH₃<br>C₃H₆OH | 70%<br>24%<br>6% | reddish blue |
| 17 | 2,1-benzisothiazol-3-yl | C₃H₆OC₂H₄OCOCH₃<br>C₃H₆OC₂H₄OH<br>C₂H₄OCOCH₃<br>C₂H₄OH | 56%<br>14%<br>24%<br>6% | dull red |
| 18 | 3-methyl-4-cyano-5-methoxycarbonyl-2-methylthien-yl | C₂H₄OC₂H₄OCOCH₃<br>C₂H₄OC₂H₄OH<br>C₂H₄OCOCH₃<br>C₂H₄OH | 52%<br>13%<br>28%<br>7% | bordeaux |
| 19 | 3-methyl-4-cyano-5-methoxycarbonyl-2-methylthien-yl | C₃H₆OC₂H₄OCH₃<br>C₃H₆OCH₃ | 70%<br>30% | bordeaux |
| 20 | 3-methyl-4-methoxycarbonyl-5-methyl-2-cyano-thien-yl | C₂H₄OC₂H₄OCHO<br>C₂H₄OC₂H₄OH<br>C₂H₄OCHO<br>C₂H₄OH | 48%<br>12%<br>32%<br>8% | bordeaux |
| 21 | 7-nitro-4-methyl-benzisothiazol-3-yl | C₂H₄OC₂H₄OCHO<br>C₂H₄OC₂H₄OH<br>C₂H₄OCHO<br>C₂H₄OH | 48%<br>12%<br>32%<br>8% | bordeaux |
| 22 | 6-methoxy-2-(4-methylphenyl)benzothiazol-yl | C₂H₄OC₂H₄OCHO<br>C₂H₄OC₂H₄OH<br>C₂H₄OCHO<br>C₂H₄OH | 48%<br>12%<br>32%<br>8% | yellowish red |
| 23 | 6-methoxy-2-(4-methylphenyl)benzothiazol-yl | C₃H₆OC₂H₄OCH₃<br>C₃H₆OCHO<br>C₃H₆OH | 60%<br>32%<br>8% | yellowish red |
| 24 | 2-bromo-4-nitrophenyl | C₂H₄OC₂H₄OCOCH<br>C₂H₄OC₂H₄OH<br>C₂H₄OCOCH₃<br>C₂H₄OH | 48%<br>12%<br>32%<br>8% | yellowish red |

TABLE 2

[Structure: benzothiazole with W¹, W² substituents, azo-linked to pyridine bearing CH₃, CN, and two NH groups substituted with Q¹ and Q²]

Q¹ = U 80%, tolyl-K 20%
Q² = U 20%, tolyl-K 80%

| Ex. No. | U | | K | W¹ | W² | Hue on polyester |
|---|---|---|---|---|---|---|
| 25 | $C_3H_6OC_2H_4OCH_3$ | | 80% H | H | H | red |
| | $C_3H_6OCHO$ | 16% | | | | |
| | $C_3H_6OH$ | 4% | | | | |
| 26 | $(CH_2)_3O(CH_2)_2OCH_3$ | 80% | $OCH_3$ | H | H | bluish red |
| | $(CH_2)_3OCHO$ | 16% | | | | |
| | $(CH_2)_3OH$ | 4% | | | | |
| 27 | $(CH_2)_3O(CH_2)_2OCH_3$ | 80% | $OCH_3$ | H | $OCH_3$ | bluish red |
| | $(CH_2)_3OCHO$ | 16% | | | | |
| | $(CH_2)_3OH$ | 4% | | | | |
| 28 | $(CH_2CH_2O)_2CHO$ | 64% | $OCH_3$ | H | H | red |
| | $(CH_2CH_2O)_2H$ | 16% | | | | |
| | $CH_2CH_2OCHO$ | 16% | | | | |
| | $CH_2CH_2OH$ | 4% | | | | |
| 29 | $(CH_2CH_2O)_2COCH_3$ | 64% | $OCH_3$ | H | H | bluish red |
| | $(CH_2CH_2O)_2H$ | 16% | | | | |
| | $CH_2CH_2OCOCH_3$ | 16% | | | | |
| | $CH_2CH_2OH$ | 4% | | | | |
| 30 | $(CH_2CH_2O)_2COCH_3$ | 60% | H | H | Cl | red |
| | $(CH_2CH_2O)_2H$ | 15% | | | | |
| | $(CH_2)_3OCOCH_3$ | 20% | | | | |
| | $(CH_2)_3OH$ | 5% | | | | |
| 31 | $(CH_2CH_2O)_2COCH_3$ | 64% | H | H | SCN | red |
| | $(CH_2CH_2O)_2H$ | 16% | | | | |
| | $(CH_2)_3OCOCH_3$ | 16% | | | | |
| | $(CH_2)_3OH$ | 4% | | | | |
| 32 | $(CH_2)_3O(CH_2)_2OCH_3$ | 80% | H | Cl | Cl | red |
| | $(CH_2)_3OCOCH_3$ | 16% | | | | |
| | $(CH_2)_3OH$ | 4% | | | | |
| 33 | $(CH_2)_3O(CH_2)_2OCH_3$ | 80% | H | H | $SO_2CH_3$ | bluish red |
| | $(CH_2)_3OCOCH_3$ | 16% | | | | |
| | $(CH_2)_3OH$ | 4% | | | | |
| 34 | $(CH_2CH_2O)_2CHO$ | 64% | H | H | H | red |
| | $(CH_2CH_2O)_2H$ | 16% | | | | |
| | $(CH_2)_3OCH_3$ | 20% | | | | |
| 35 | $(CH_2CH_2O)_2CHO$ | 64% | $OCH_3$ | H | H | bluish red |
| | $(CH_2CH_2O)_2H$ | 16% | | | | |
| | $(CH_2)_3OCHO$ | 16% | | | | |
| | $(CH_2)_3OH$ | 4% | | | | |

TABLE 3

Mixture of 35% of dye of the formula A

D—N=N—[pyridine ring with CH₃, CN, Q¹—HN, NH—Q²]  (A)

and 65% of dye of the formula B

D—N=N—[pyridine ring with CH₃, CN, Q³—HN, NH—Q⁴]  (B)

where

| Q¹ = C₃H₆OCH₃ | 70% | Q² = C₃H₆OCH₃ | 30% |
| phenyl-K | 30% | phenyl-K | 70% |
| Q³ = E—OW | 70% | Q⁴ = E—OW | 30% |
| phenyl-K | 30% | phenyl-K | 70% |

W = CHO  80%   (W¹) or CH₃ (W²)
    H    20%

| Ex. No. | D | E—OW | K | Hue on polyester |
|---|---|---|---|---|
| 36 | 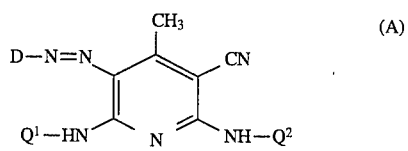 | C₂H₄OC₂H₄OW¹ | H | reddish blue |
| 37 | 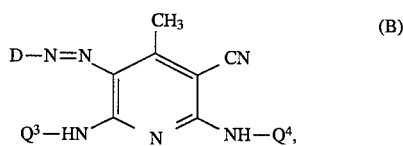 | C₃H₆OC₄H₈OW¹ | H | reddish blue |
| 38 | 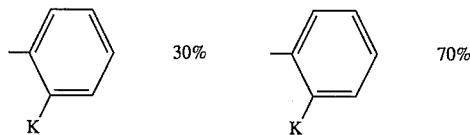 | C₃H₆OC₂H₄OW² | H | reddish blue |
| 39 | 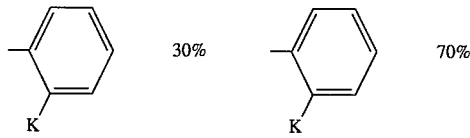 | C₃H₆O(C₂H₄O)₂W² | H | reddish blue |
| 40 | phenyl-N=N-thiophene(CN, CH₃) | C₂H₄OC₂H₄OW¹ | OCH₃ | navy |

TABLE 3-continued

| # | Structure | R | R' | Color |
|---|---|---|---|---|
| 41 | phenyl-N=N-[thiophene(CN)(CH₃)] | $C_3H_6OC_4H_8OW^1$ | $OCH_3$ | navy |
| 42 | phenyl-N=N-[thiophene(CN)(CH₃)] | $C_3H_6OC_2H_4OW^2$ | $OCH_3$ | navy |
| 43 | phenyl-N=N-[thiophene(CN)(CH₃)] | $C_3H_6O(C_2H_4O)_2W^2$ | $OCH_3$ | navy |
| 44 | 3-methylphenyl-N=N-[thiophene(CN)(CH₃)] | $C_2H_4OC_2H_4OW^1$ | $OCH_3$ | navy |
| 45 | 3-methylphenyl-N=N-[thiophene(CN)(CH₃)] | $C_3H_6OC_2H_4OW^2$ | $OCH_3$ | navy |
| 46 | 3-methylphenyl-N=N-[thiophene(CN)(CH₃)] | $C_3H_6OC_4H_8OW^1$ | $OCH_3$ | navy |
| 47 | 2,5-dimethylphenyl-N=N-[thiophene(CN)(CH₃)] | $C_2H_4OC_2H_4OW^1$ | $OCH_3$ | navy |
| 48 | phenyl-N=N-[thiophene(OCH₃)(CN)(CH₃)] | $C_2H_4OC_2H_4OW^1$ | H | blue |
| 49 | phenyl-N=N-[thiophene(OC₂H₅)(CN)(CH₃)] | $C_2H_4OC_2H_4OW^1$ | H | blue |

TABLE 3-continued
| | | | | |
|---|---|---|---|---|
| 50 | 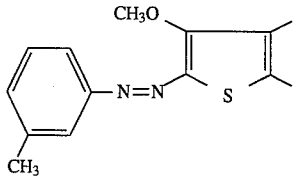 | C₂H₄OC₂H₄OW¹ | H | blue |
| 51 | 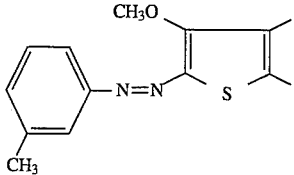 | C₂H₄OC₂H₄OW¹ | OCH₃ | navy |
| 52 | 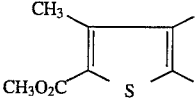 | C₂H₄OC₂H₄OW¹ | H | bluish red |
| 53 | 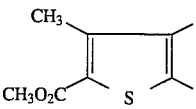 | C₃H₆OC₂H₄OW² | H | bluish red |
| 54 | 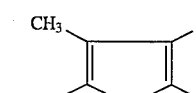 | C₃H₆OC₄H₈OW¹ | H | bluish red |
| 55 | 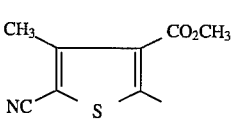 | C₂H₄OC₂H₄OW¹ | H | bordeaux |
| 56 | 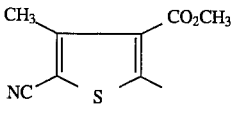 | C₃H₆OW¹ | H | bordeaux |
| 57 | 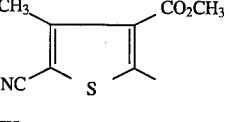 | C₃H₆OC₂H₄OW² | H | bordeaux |
| 58 | 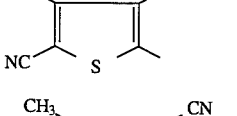 | C₂H₄OC₂H₄OW¹ | H | bordeaux |
| 59 | 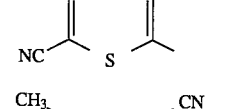 | C₂H₄OC₂H₄OW¹ | H | violet |
| 60 | 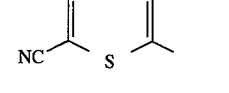 | C₃H₆OC₂H₄OW² | H | violet |
| 61 | 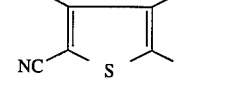 | C₃H₆OC₄H₈OW¹ | H | violet |
| 62 | 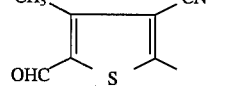 | C₃H₆OC₄H₈OW¹ | H | violet |

TABLE 3-continued

| # | Structure | Col3 | Col4 | Color |
|---|---|---|---|---|
| 63 | 3-CH₃, 4-CN, 5-methyl, 2-CHO thiophene | C₂H₄OC₂H₄OW¹ | H | violet |
| 64 | 3-Cl, 4-CN, 5-methyl, 2-CHO thiophene | C₂H₄OC₂H₄OW¹ | H | violet |
| 65 | 3-Cl, 4-CN, 5-methyl, 2-CHO thiophene | C₃H₆OC₄H₈OW¹ | H | violet |
| 66 | Cl, N-isopropylidene, OHC, S thiazole | C₃H₆OC₄H₈OW¹ | H | violet |
| 67 | Cl, N-isopropylidene, OHC, S thiazole | C₂H₄OC₂H₄OW¹ | H | violet |
| 68 | C₆H₅-C(=N)-N=S, isopropylidene thiadiazole | C₂H₄OC₂H₄OW¹ | H | reddish yellow |
| 69 | 2-CO₂CH₃, 5-O₂N, methyl benzene | C₂H₄OC₂H₄OW¹ | H | red |
| 70 | phenyl-N=N-(3-Cl-4-methyl)phenyl | C₂H₄OC₂H₄OW¹ | H | red |
| 71 | phenyl-N=N-(3-Cl-4-methyl)phenyl | C₃H₆OC₄H₈OW¹ | H | red |
| 72 | phenyl-N=N-(3-Cl-4-methyl)phenyl | C₃H₆OC₂H₄OW² | H | red |
| 73 | 1-methyl anthraquinone | C₂H₄OC₂H₄OW¹ | H | brownish red |

TABLE 3-continued

| # | Structure | | | |
|---|---|---|---|---|
| 74 | 1-substituted anthraquinone | $C_3H_6OC_4H_8OW^1$ | H | brownish red |
| 75 | 1-substituted anthraquinone | $C_4H_8OW^1$ | H | brownish red |
| 76 | 1-substituted anthraquinone | $C_3H_6OC_2H_4OW^2$ | H | brownish red |
| 77 | 3-Br-4-substituted azobenzene | $C_2H_4OC_2H_4OW^1$ | H | red |
| 78 | 3-Br-4-substituted azobenzene | $C_3H_6OC_4H_8OW^1$ | H | red |
| 79 | 3-CN-4-substituted azobenzene | $C_2H_4OC_2H_4OW^1$ | H | bluish red |
| 80 | 3-CN-4-substituted azobenzene | $C_3H_6OC_4H_8OW^1$ | H | bluish red |
| 81 | 3-CN-2-substituted benzothiophene | $C_2H_4OC_2H_4OW^1$ | H | red |
| 82 | 7-$O_2N$-4-substituted benzisothiazole | $C_2H_4OC_2H_4OW^1$ | H | red |
| 83 | 3-$CH_3$-4-CN-2-$C_2H_5O_2C$-5-substituted thiophene | $C_2H_4OC_2H_4OW^1$ | H | bluish red |
| 84 | 4-substituted azobenzene | $C_2H_4OC_2H_4OW^1$ | H | reddish yellow |

TABLE 3-continued

| # | Structure | R | R' | Color |
|---|---|---|---|---|
| 85 | CH₃O-C₆H₄-N=N-C₆H₄- | C₂H₄OC₂H₄OW¹ | H | reddish yellow |
| 86 | CH₃O-C₆H₄-N=N-C₆H₃(Cl)- | C₂H₄OC₂H₄OW¹ | H | red |
| 87 | 3-(C₆H₅-OCH₂)-4-CN-isothiazol-5-yl | C₂H₄OC₂H₄OW¹ | H | yellowish red |
| 88 | 3-CH₃-4-CN-isothiazol-5-yl | C₂H₄OC₂H₄OW¹ | H | reddish yellow |
| 89 | 3-CH₃-4-CN-isothiazol-5-yl | C₃H₆OC₂H₄OW² | H | reddish yellow |
| 90 | 3-(C₆H₅-CH₂)-4-CN-isothiazol-5-yl | C₂H₄OC₂H₄OW¹ | H | yellowish red |
| 91 | 3-(C₆H₅-CH₂)-4-CN-isothiazol-5-yl | C₃H₆OC₂H₄OW² | H | yellowish red |
| 92 | 3-(C₆H₅-CH₂)-4-CN-isothiazol-5-yl | C₂H₄OC₂H₄OW¹ | OCH₃ | red |
| 93 | 3-(C₆H₅-CH₂)-4-CN-isothiazol-5-yl | C₃H₆OC₂H₄OW² | OCH₃ | red |
| 94 | 3-C₆H₅-4-CN-isothiazol-5-yl | C₂H₄OC₂H₄OW¹ | H | yellowish red |
| 95 | 3-C₆H₅-4-CN-isothiazol-5-yl | C₃H₆OC₂H₄OW² | H | yellowish red |
| 96 | 3-C₆H₅-4-CN-isothiazol-5-yl | C₃H₆OC₂H₄OW² | OCH₃ | red |
| 97 | 3-C₆H₅-4-CN-isothiazol-5-yl | C₂H₄OC₂H₄OW¹ | OCH₃ | red |

TABLE 3-continued

| # | Structure | Col3 | Col4 | Color |
|---|---|---|---|---|
| 98 | thiophene-isothiazole with CN, CH3 | $C_2H_4OC_2H_4OW^1$ | H | red |
| 99 | thiophene-isothiazole with CN, CH3 | $C_3H_6OC_4H_8OW^1$ | H | red |
| 100 | thiophene-isothiazole with CN, CH3 | $C_2H_4OC_2H_4OW^1$ | H | red |
| 101 | thiophene-isothiazole with CN, CH3 | $C_3H_6OC_2H_4OW^2$ | $OCH_3$ | red |
| 102 | $CH_3OC_2H_4$-isothiazole with CN, CH3 | $C_3H_6OC_2H_4OW^2$ | H | yellowish red |
| 103 | 3-chlorophenyl-N=N-3-methyl-4-phenyl | $C_3H_6OC_2H_4OW^2$ | H | yellowish red |
| 104 | Cl, NC, N, S, CH3 structure | $C_3H_6OC_2H_4OW^2$ | H | red |

Similar results are obtained on using the mixtures listed in Table 3, which contain the dyes A and B in weight ratios of 30:70 and 40:60.

TABLE 4
Mixture of 35% of dye of the formula A
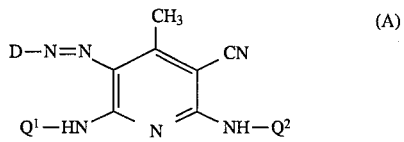
(A)
and 65% of dye of the formula B
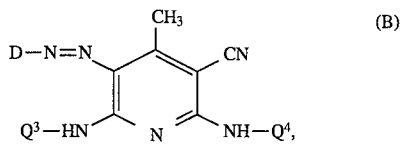
(B)
where:
| | | | |
|---|---|---|---|
| $Q^1 = C_4H_8OW^1$ | 70% | $Q^2 = C_4H_8OW^1$ | 30% |
| 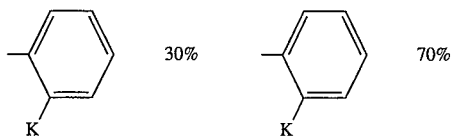 | 30% | 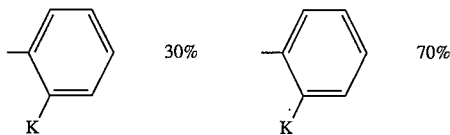 | 70% |
| $Q^3 = E—OW$ | 70% | $Q^4 = E—OW$ | 30% |
| | 30% | | 70% |
W = CHO  80%
    H    20%   ($W^1$) or $CH_3$ ($W^2$)
| Ex. No. | D | E—OW | K | Hue on polyester |
|---|---|---|---|---|
| 105 | 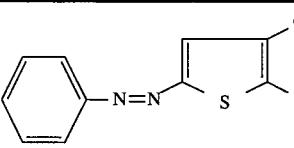 | $C_2H_4OC_2H_4OW^1$ | H | reddish blue |
| 106 | 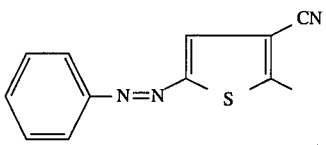 | $C_3H_6OC_4H_8OW^1$ | H | reddish blue |
| 107 | 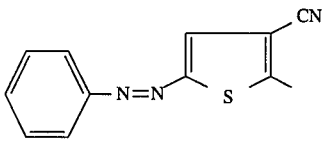 | $C_3H_6OC_2H_4OW^2$ | H | reddish blue |
| 108 | 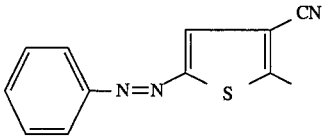 | $C_3H_6O(C_2H_4O)_2W^2$ | H | reddish blue |
| 109 | 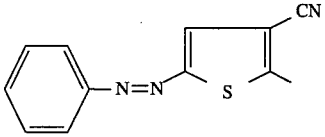 | $C_2H_4OC_2H_4OW^1$ | $OCH_3$ | navy |

TABLE 4-continued

| # | Structure | | | |
|---|---|---|---|---|
| 110 | Ph-N=N-[thiophene: 2-CH3, 3-CN, 5-] | C₃H₆OC₄H₈OW¹ | OCH₃ | navy |
| 111 | Ph-N=N-[thiophene: 2-CH3, 3-CN, 5-] | C₃H₆OC₂H₄OW² | OCH₃ | navy |
| 112 | Ph-N=N-[thiophene: 2-CH3, 3-CN, 5-] | C₃H₆O(C₂H₄O)₂W² | OCH₃ | navy |
| 113 | 3-CH₃-C₆H₄-N=N-[thiophene: 2-CH3, 3-CN, 5-] | C₂H₄OC₂H₄OW¹ | OCH₃ | navy |
| 114 | 3-CH₃-C₆H₄-N=N-[thiophene: 2-CH3, 3-CN, 5-] | C₃H₆OC₂H₄OW² | OCH₃ | navy |
| 115 | 3-CH₃-C₆H₄-N=N-[thiophene: 2-CH3, 3-CN, 5-] | C₃H₆OC₄H₈OW¹ | OCH₃ | navy |
| 116 | 2,5-(CH₃)₂-C₆H₃-N=N-[thiophene: 2-CH3, 3-CN, 5-] | C₂H₄OC₂H₄OW¹ | OCH₃ | navy |
| 117 | Ph-N=N-[thiophene: 2-CH3, 3-CN, 4-OCH3, 5-] | C₂H₄OC₂H₄OW¹ | H | blue |
| 118 | Ph-N=N-[thiophene: 2-CH3, 3-CN, 4-OC2H5, 5-] | C₂H₄OC₂H₄OW¹ | H | blue |

TABLE 4-continued

| # | Structure | R | R' | Color |
|---|---|---|---|---|
| 119 | 3-CH₃-C₆H₄-N=N-[thiophene: 3-OCH₃, 4-CN, 5-CH₃] | C₂H₄OC₂H₄OW¹ | H | blue |
| 120 | 3-CH₃-C₆H₄-N=N-[thiophene: 3-OCH₃, 4-CN, 5-CH₃] | C₂H₄OC₂H₄OW¹ | OCH₃ | navy |
| 121 | [thiophene: 2-CH₃O₂C, 3-CH₃, 4-CN, 5-CH₃] | C₂H₄OC₂H₄OW¹ | H | bluish red |
| 122 | [thiophene: 2-CH₃O₂C, 3-CH₃, 4-CN, 5-CH₃] | C₃H₆OC₂H₄OW² | H | bluish red |
| 123 | [thiophene: 2-CH₃O₂C, 3-CH₃, 4-CN, 5-CH₃] | C₃H₆OC₄H₈OW¹ | H | bluish red |
| 124 | [thiophene: 2-NC, 3-CH₃, 4-CO₂CH₃, 5-CH₃] | C₂H₄OC₂H₄OW¹ | H | bordeaux |
| 125 | [thiophene: 2-NC, 3-CH₃, 4-CO₂CH₃, 5-CH₃] | C₃H₆OW¹ | H | bordeaux |
| 126 | [thiophene: 2-NC, 3-CH₃, 4-CO₂CH₃, 5-CH₃] | C₃H₆OC₂H₄OW² | H | bordeaux |
| 127 | [thiophene: 2-NC, 3-CH₃, 4-CO₂C₂H₅, 5-CH₃] | C₂H₄OC₂H₄OW¹ | H | bordeaux |
| 128 | [thiophene: 2-NC, 3-CH₃, 4-CN, 5-CH₃] | C₂H₄OC₂H₄OW¹ | H | violet |
| 129 | [thiophene: 2-NC, 3-CH₃, 4-CN, 5-CH₃] | C₃H₆OC₂H₄OW² | H | violet |
| 130 | [thiophene: 2-NC, 3-CH₃, 4-CN, 5-CH₃] | C₃H₆OC₄H₈OW¹ | H | violet |
| 131 | [thiophene: 2-OHC, 3-CH₃, 4-CN, 5-CH₃] | C₃H₆OC₄H₈OW¹ | H | violet |

TABLE 4-continued
| 132 | 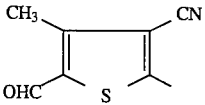 | C₂H₄OC₂H₄OW¹ | H | violet |
|---|---|---|---|---|
| 133 | 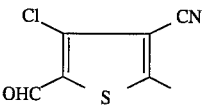 | C₂H₄OC₂H₄OW¹ | H | violet |
| 134 | 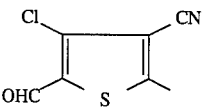 | C₃H₆OC₄H₈OW¹ | H | violet |
| 135 | 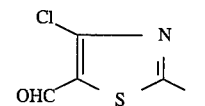 | C₃H₆OC₄H₈OW¹ | H | violet |
| 136 | 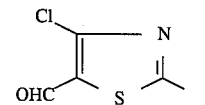 | C₂H₄OC₂H₄OW¹ | H | violet |
| 137 | 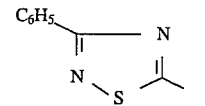 | C₂H₄OC₂H₄OW¹ | H | reddish yellow |
| 138 | 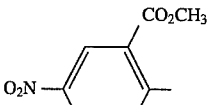 | C₂H₄OC₂H₄OW¹ | H | red |
| 139 | 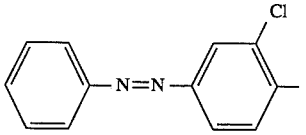 | C₂H₄OC₂H₄OW¹ | H | red |
| 140 | 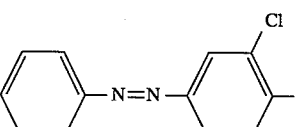 | C₃H₆OC₄H₈OW¹ | H | red |
| 141 | 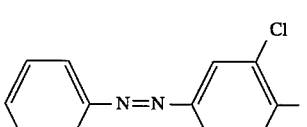 | C₃H₆OC₂H₄OW² | H | red |
| 142 | 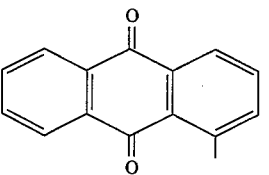 | C₂H₄OC₂H₄OW¹ | H | brownish red |

TABLE 4-continued

| # | Structure | R | R' | Color |
|---|---|---|---|---|
| 143 | 1-substituted anthraquinone | $C_3H_6OC_4H_8OW^1$ | H | brownish red |
| 144 | 1-substituted anthraquinone | $C_3H_6OC_2H_4OW^2$ | H | brownish red |
| 145 | phenyl-N=N-(3-Br-phenyl)- | $C_2H_4OC_2H_4OW^1$ | H | red |
| 146 | phenyl-N=N-(3-Br-phenyl)- | $C_3H_6OC_4H_8OW^1$ | H | red |
| 147 | phenyl-N=N-(3-CN-phenyl)- | $C_2H_4OC_2H_4OW^1$ | H | bluish red |
| 148 | phenyl-N=N-(3-CN-phenyl)- | $C_3H_6OC_4H_8OW^1$ | H | bluish red |
| 149 | 3-CN-benzothiophen-2-yl | $C_2H_4OC_2H_4OW^1$ | H | red |
| 150 | 7-nitro-benzisothiazol-3-yl | $C_2H_4OC_2H_4OW^1$ | H | red |
| 151 | 3-methyl-4-CN-5-(ethoxycarbonyl)-thiophen-2-yl | $C_2H_4OC_2H_4OW^1$ | H | bluish red |
| 152 | phenyl-N=N-phenyl- | $C_2H_4OC_2H_4OW^1$ | H | reddish yellow |
| 153 | (4-CH$_3$O-phenyl)-N=N-phenyl- | $C_2H_4OC_2H_4OW^1$ | H | reddish yellow |

TABLE 4-continued

| # | Structure | | | |
|---|---|---|---|---|
| 154 | CH₃O—C₆H₄—N=N—C₆H₃(Cl)(CH₃) | C₂H₄OC₂H₄OW¹ | H | red |
| 155 | C₆H₅—OCH₂-isothiazole-CN-CH₃ | C₂H₄OC₂H₄OW¹ | H | yellowish red |
| 156 | CH₃-isothiazole-CN-CH₃ | C₂H₄OC₂H₄OW¹ | H | reddish yellow |
| 157 | CH₃-isothiazole-CN-CH₃ | C₃H₆OC₂H₄OW² | H | reddish yellow |
| 158 | C₆H₅—CH₂-isothiazole-CN-CH₃ | C₂H₄OC₂H₄OW¹ | H | yellowish red |
| 159 | C₆H₅—CH₂-isothiazole-CN-CH₃ | C₃H₆OC₂H₄OW² | H | yellowish red |
| 160 | C₆H₅—CH₂-isothiazole-CN-CH₃ | C₂H₄OC₂H₄OW¹ | OCH₃ | red |
| 161 | C₆H₅—CH₂-isothiazole-CN-CH₃ | C₃H₆OC₂H₄OW² | OCH₃ | red |
| 162 | C₆H₅-isothiazole-CN-CH₃ | C₂H₄OC₂H₄OW¹ | H | yellowish red |
| 163 | C₆H₅-isothiazole-CN-CH₃ | C₃H₆OC₂H₄OW² | H | yellowish red |
| 164 | C₆H₅-isothiazole-CN-CH₃ | C₃H₆OC₂H₄OW² | OCH₃ | red |
| 165 | C₆H₅-isothiazole-CN-CH₃ | C₂H₄OC₂H₄OW¹ | OCH₃ | red |
| 166 | thiophene-isothiazole-CN-CH₃ | C₂H₄OC₂H₄OW¹ | H | red |

TABLE 4-continued

| | Structure | | | |
|---|---|---|---|---|
| 167 | [thiophene-isothiazole with CN and CH3 substituents] | C₃H₆OC₄H₈OW¹ | H | red |
| 168 | [thiophene-isothiazole with CN and CH3 substituents] | C₂H₄OC₂H₄OW¹ | H | red |
| 169 | [thiophene-isothiazole with CN and CH3 substituents] | C₃H₆OC₂H₄OW² | OCH₃ | red |
| 170 | [CH₃OC₂H₄-isothiazole with CN and CH3] | C₃H₆OC₂H₄OW² | H | yellowish red |
| 171 | [3-chlorophenyl-N=N-4-methylphenyl] | C₃H₆OC₂H₄OW² | H | yellowish red |
| 172 | [Cl, NC-substituted thiazole with isopropyl] | C₃H₆OC₂H₄OW² | H | red |

Similar results are obtained on using the mixtures listed in Table 4, which contain the dyes A and B in weight ratios of 30:70 and 40:60.

TABLE 5
Mixture of 35% of dye of the formula A
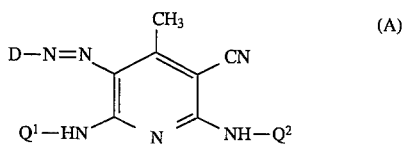
and 65% of dye of the formula B
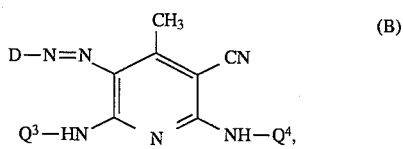
where:
| | | | |
|---|---|---|---|
| $Q^1 = C_4H_8OW^3$ | 70% | $Q^2 = C_4H_8OW^3$ | 30% |
| (phenyl-K) | 30% | (phenyl-K) | 70% |
| $Q^3 = E-OW$ | 70% | $Q^4 = E-OW$ | 30% |
| (phenyl-K) | 30% | (phenyl-K) | 70% |
W = CHO  80%
    H    20%   ($W^1$) or $CH_3$ ($W^2$)
$W^3$  $CH_3CO$  80%
       H         20%
| Ex. No. | D | E—OW | K | Hue on polyester |
|---|---|---|---|---|
| 173 | 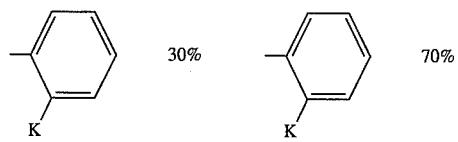 | $C_2H_4OC_2H_4OW^1$ | H | reddish blue |
| 174 | 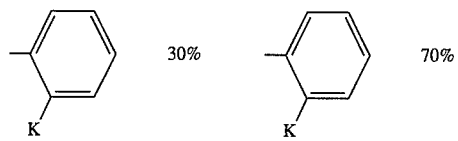 | $C_3H_6OC_4H_8OW^1$ | H | reddish blue |
| 175 | 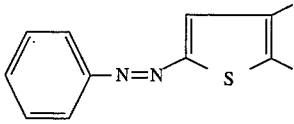 | $C_3H_6OC_2H_4OW^2$ | H | reddish blue |
| 176 | 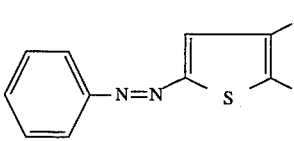 | $C_3H_6O(C_2H_4O)_2W^2$ | H | reddish blue |

TABLE 5-continued

| # | Structure | R | R' | Color |
|---|---|---|---|---|
| 177 | phenyl-N=N-[thiophene(CN)(CH₃)] | $C_2H_4OC_2H_4OW^1$ | $OCH_3$ | navy |
| 178 | phenyl-N=N-[thiophene(CN)(CH₃)] | $C_3H_6OC_4H_8OW^1$ | $OCH_3$ | navy |
| 179 | phenyl-N=N-[thiophene(CN)(CH₃)] | $C_3H_6OC_2H_4OW^2$ | $OCH_3$ | navy |
| 180 | phenyl-N=N-[thiophene(CN)(CH₃)] | $C_3H_6O(C_2H_4O)_2W^2$ | $OCH_3$ | navy |
| 181 | 3-methylphenyl-N=N-[thiophene(CN)(CH₃)] | $C_2H_4OC_2H_4OW^1$ | $OCH_3$ | navy |
| 182 | 3-methylphenyl-N=N-[thiophene(CN)(CH₃)] | $C_3H_6OC_2H_4OW^2$ | $OCH_3$ | navy |
| 183 | 3-methylphenyl-N=N-[thiophene(CN)(CH₃)] | $C_3H_6OC_4H_8OW^1$ | $OCH_3$ | navy |
| 184 | 2,5-dimethylphenyl-N=N-[thiophene(CN)(CH₃)] | $C_2H_4OC_2H_4OW^1$ | $OCH_3$ | navy |
| 185 | 2-methoxyphenyl-N=N-[thiophene(CN)(CH₃)] | $C_2H_4OC_2H_4OW^1$ | H | blue |
| 186 | 2-ethoxyphenyl-N=N-[thiophene(CN)(CH₃)] | $C_2H_4OC_2H_4OW^1$ | H | blue |

TABLE 5-continued

| # | Structure | | | Color |
|---|---|---|---|---|
| 187 | 3-methylphenyl-N=N- thiophene with CH₃O, CN, CH₃ substituents | $C_2H_4OC_2H_4OW^1$ | H | blue |
| 188 | 3-methylphenyl-N=N- thiophene with CH₃O, CN, CH₃ substituents | $C_2H_4OC_2H_4OW^1$ | $OCH_3$ | navy |
| 189 | thiophene with CH₃, CN, CH₃O₂C, CH₃ | $C_2H_4OC_2H_4OW^1$ | H | bluish red |
| 190 | thiophene with CH₃, CN, CH₃O₂C, CH₃ | $C_3H_6OC_2H_4OW^2$ | H | bluish red |
| 191 | thiophene with CH₃, CN, CH₃O₂C, CH₃ | $C_3H_6OC_4H_8OW^1$ | H | bluish red |
| 192 | thiophene with CH₃, CO₂CH₃, NC, CH₃ | $C_2H_4OC_2H_4OW^1$ | H | bordeaux |
| 193 | thiophene with CH₃, CO₂CH₃, NC, CH₃ | $C_3H_6OW^1$ | H | bordeaux |
| 194 | thiophene with CH₃, CO₂CH₃, NC, CH₃ | $C_3H_6OC_2H_4OW^2$ | H | bordeaux |
| 195 | thiophene with CH₃, CO₂C₂H₅, NC, CH₃ | $C_2H_4OC_2H_4OW^1$ | H | bordeaux |
| 196 | thiophene with CH₃, CN, NC, CH₃ | $C_2H_4OC_2H_4OW^1$ | H | violet |
| 197 | thiophene with CH₃, CN, NC, CH₃ | $C_3H_6OC_2H_4OW^2$ | H | violet |
| 198 | thiophene with CH₃, CN, NC, CH₃ | $C_3H_6OC_4H_8OW^1$ | H | violet |
| 199 | thiophene with CH₃, CN, OHC, CH₃ | $C_3H_6OC_4H_8OW^1$ | H | violet |

TABLE 5-continued

| # | Structure | R | R' | Color |
|---|---|---|---|---|
| 200 | 3-CH₃, 4-CN, 5-CHO thiophene (2-yl) | C₂H₄OC₂H₄OW¹ | H | violet |
| 201 | 3-Cl, 4-CN, 5-CHO thiophene (2-yl) | C₂H₄OC₂H₄OW¹ | H | violet |
| 202 | 3-Cl, 4-CN, 5-CHO thiophene (2-yl) | C₃H₆OC₄H₈OW¹ | H | violet |
| 203 | 3-Cl, 5-CHO, 4-(N=C(CH₃)-) isothiazole | C₃H₆OC₄H₈OW¹ | H | violet |
| 204 | 3-Cl, 5-CHO, 4-(N=C(CH₃)-) isothiazole | C₂H₄OC₂H₄OW¹ | H | violet |
| 205 | 3-C₆H₅, 5-(C(CH₃)=N-) isothiazole | C₂H₄OC₂H₄OW¹ | H | reddish yellow |
| 206 | 2-CO₂CH₃, 4-NO₂ phenyl | C₂H₄OC₂H₄OW¹ | H | red |
| 207 | 3-Cl, 4-(phenylazo) phenyl | C₂H₄OC₂H₄OW¹ | H | red |
| 208 | 3-Cl, 4-(phenylazo) phenyl | C₃H₆OC₄H₈OW¹ | H | red |
| 209 | 3-Cl, 4-(phenylazo) phenyl | C₃H₆OC₂H₄OW² | H | red |
| 210 | anthraquinon-1-yl | C₂H₄OC₂H₄OW¹ | H | brownish red |

TABLE 5-continued
| | | | | |
|---|---|---|---|---|
| 211 | 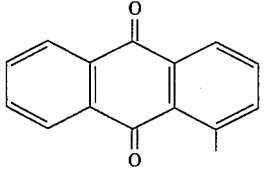 | $C_3H_6OC_4H_8OW^1$ | H | brownish red |
| 212 | 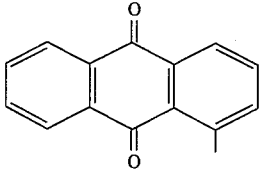 | $C_3H_6OC_2H_4OW^2$ | H | brownish red |
| 213 | 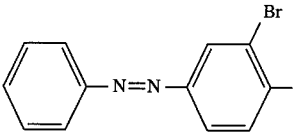 | $C_2H_4OC_2H_4OW^1$ | H | red |
| 214 | 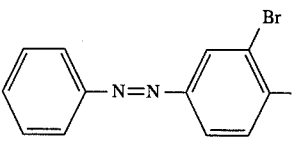 | $C_3H_6OC_4H_8OW^1$ | H | red |
| 215 | 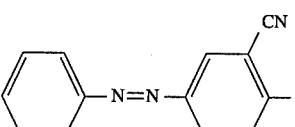 | $C_2H_4OC_2H_4OW^1$ | H | bluish red |
| 216 | 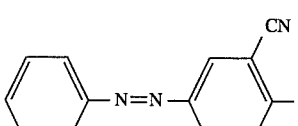 | $C_3H_6OC_4H_8OW^1$ | H | bluish red |
| 217 | 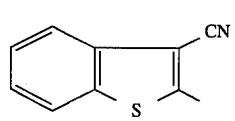 | $C_2H_4OC_2H_4OW^1$ | H | red |
| 218 | 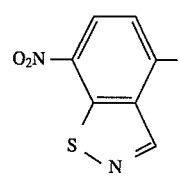 | $C_2H_4OC_2H_4OW^1$ | H | red |
| 219 | 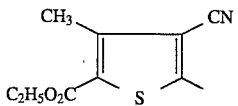 | $C_2H_4OC_2H_4OW^1$ | H | bluish red |
| 220 | 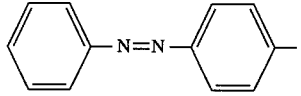 | $C_2H_4OC_2H_4OW^1$ | E | reddish yellow |
| 221 | 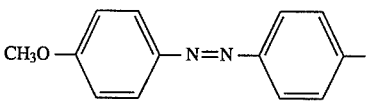 | $C_2H_4OC_2H_4OW^1$ | H | reddish yellow |

TABLE 5-continued

| No. | Structure | | R | R' | Color |
|---|---|---|---|---|---|
| 222 | 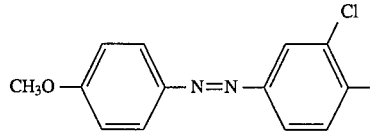 | Cl | C$_2$H$_4$OC$_2$H$_4$OW$^1$ | H | red |
| 223 | 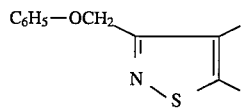 | | C$_2$H$_4$OC$_2$H$_4$OW$^1$ | H | yellowish red |
| 224 | 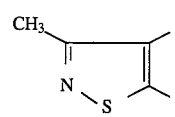 | | C$_2$H$_4$OC$_2$H$_4$OW$^1$ | H | reddish yellow |
| 225 | 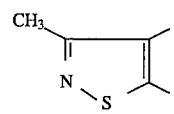 | | C$_3$H$_6$OC$_2$H$_4$OW$^2$ | H | reddish yellow |
| 226 | 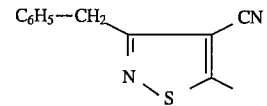 | | C$_2$H$_4$OC$_2$H$_4$OW$^1$ | H | yellowish red |
| 227 | 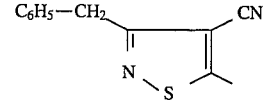 | | C$_3$H$_6$OC$_2$H$_4$OW$^2$ | H | yellowish red |
| 228 | 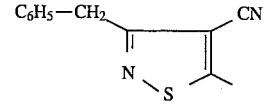 | | C$_2$H$_4$OC$_2$H$_4$OW$^1$ | OCH$_3$ | red |
| 229 | 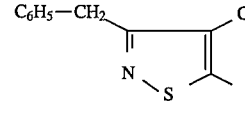 | | C$_3$H$_6$OC$_2$H$_4$OW$^2$ | OCH$_3$ | red |
| 230 | 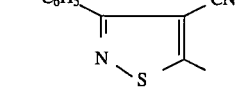 | | C$_2$H$_4$OC$_2$H$_4$OW$^1$ | H | yellowish red |
| 231 | 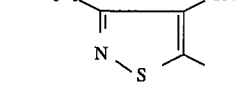 | | C$_3$H$_6$OC$_2$H$_4$OW$^2$ | H | yellowish red |
| 232 | 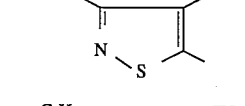 | | C$_3$H$_6$OC$_2$H$_4$OW$^2$ | OCH$_3$ | red |
| 233 | 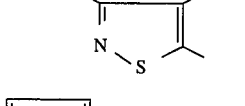 | | C$_2$H$_4$OC$_2$H$_4$OW$^1$ | OCH$_3$ | red |
| 234 | 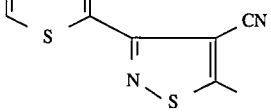 | | C$_2$H$_4$OC$_2$H$_4$OW$^1$ | H | red |

TABLE 5-continued

| # | Structure | | | |
|---|---|---|---|---|
| 235 | [thiophene-isothiazole-CN-CH3 structure] | $C_3H_6OC_4H_8OW^1$ | H | red |
| 236 | [thiophene-isothiazole-CN-CH3 structure] | $C_2H_4OC_2H_4OW^1$ | H | red |
| 237 | [thiophene-isothiazole-CN-CH3 structure] | $C_3H_6OC_2H_4OW^2$ | $OCH_3$ | red |
| 238 | $CH_3OC_2H_4$-[isothiazole-CN-CH3 structure] | $C_3H_6OC_2H_4OW^2$ | H | yellowish red |
| 239 | [3-chlorophenyl-N=N-3-methylphenyl structure] | $C_3H_6OC_2H_4OW^2$ | H | yellowish red |
| 240 | [Cl, NC, S, N structure] | $C_3H_6OC_2H_4OW^2$ | H | red |

Similar results are obtained on using the mixtures listed in Table 5, which contain the dyes A and B in weight ratios of 30:70 and 40:60.

TABLE 6
Mixture of 35% of dye of the formula A
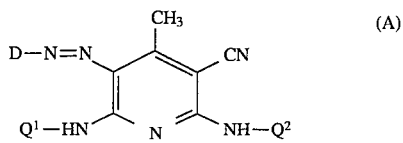
and 65% of dye of the formula B
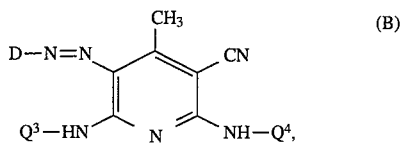
where
| | | | | |
|---|---|---|---|---|
| $Q^1 = C_2H_4OW^3$ | 80% | $Q^2 = C_2H_4OW^3$ | 20% | |
| (tolyl-K) | 20% | (tolyl-K) | 80% | |
| $Q^3 = E-OW$ | 80% | $Q^4 = E-OW$ | 20% | |
| (tolyl-K) | 20% | (tolyl-K) | 80% | |
W = CHO  80%
    H    20%   (W$^1$) or CH$_3$ (W$^2$)
W$^3$  CH$_3$CO  80%
       H         20%
| Ex. No. | D | E—OW | K | Hue on polyester |
|---|---|---|---|---|
| 241 | 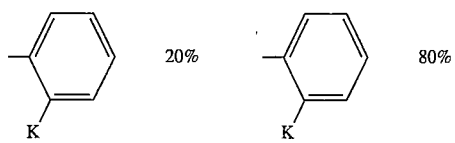 | $C_2H_4OC_2H_4OW^1$ | H | reddish blue |
| 242 | 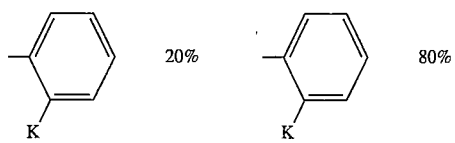 | $C_3H_6OC_4H_8OW^1$ | H | reddish blue |
| 243 | 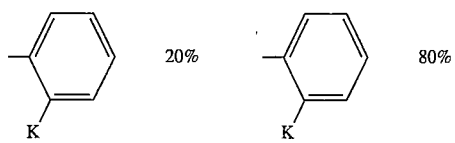 | $C_3H_6OC_2H_4OW^2$ | H | reddish blue |
| 244 | 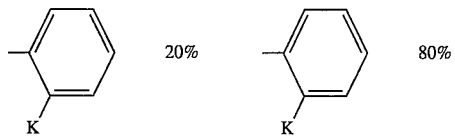 | $C_3H_6O(C_2H_4O)_2W^2$ | H | reddish blue |

TABLE 6-continued

| # | Structure | | | |
|---|---|---|---|---|
| 245 | phenyl-N=N-[thiophene: CN, CH3] | C₂H₄OC₂H₄OW¹ | OCH₃ | navy |
| 246 | phenyl-N=N-[thiophene: CN, CH3] | C₃H₆OC₄H₈OW¹ | OCH₃ | navy |
| 247 | phenyl-N=N-[thiophene: CN, CH3] | C₃H₆OC₂H₄OW² | OCH₃ | navy |
| 248 | phenyl-N=N-[thiophene: CN, CH3] | C₃H₆O(C₂H₄O)₂W² | OCH₃ | navy |
| 249 | 3-methylphenyl-N=N-[thiophene: CN, CH3] | C₂H₄OC₂H₄OW¹ | OCH₃ | navy |
| 250 | 3-methylphenyl-N=N-[thiophene: CN, CH3] | C₃H₆OC₂H₄OW² | OCH₃ | navy |
| 251 | 3-methylphenyl-N=N-[thiophene: CN, CH3] | C₃H₆OC₄H₈OW¹ | OCH₃ | navy |
| 252 | 2,5-dimethylphenyl-N=N-[thiophene: CN, CH3] | C₂H₄OC₂H₄OW¹ | OCH₃ | navy |
| 253 | 2-OCH₃-phenyl-N=N-[thiophene: CN, CH3] | C₂H₄OC₂H₄OW¹ | H | blue |
| 254 | 2-OC₂H₅-phenyl-N=N-[thiophene: CN, CH3] | C₂H₄OC₂H₄OW¹ | H | blue |

TABLE 6-continued

| # | Structure | R | R' | Color |
|---|---|---|---|---|
| 255 | 3-CH₃-C₆H₄-N=N- attached to thiophene with CH₃O, CN, CH₃ substituents | C₂H₄OC₂H₄OW¹ | H | blue |
| 256 | 3-CH₃-C₆H₄-N=N- attached to thiophene with CH₃O, CN, CH₃ substituents | C₂H₄OC₂H₄OW¹ | OCH₃ | navy |
| 257 | thiophene with CH₃, CN, CH₃O₂C, CH₃ substituents | C₂H₄OC₂H₄OW¹ | H | bluish red |
| 258 | thiophene with CH₃, CN, CH₃O₂C, CH₃ substituents | C₃H₆OC₂H₄OW² | H | bluish red |
| 259 | thiophene with CH₃, CN, CH₃O₂C, CH₃ substituents | C₃H₆OC₄H₈OW¹ | H | bluish red |
| 260 | thiophene with CH₃, CO₂CH₃, NC, CH₃ substituents | C₂H₄OC₂H₄OW¹ | H | bordeaux |
| 261 | thiophene with CH₃, CO₂CH₃, NC, CH₃ substituents | C₃H₆OC₂H₄OW² | H | bordeaux |
| 262 | thiophene with CH₃, CO₂C₂H₅, NC, CH₃ substituents | C₂H₄OC₂H₄OW¹ | H | bordeaux |
| 263 | thiophene with CH₃, CN, NC, CH₃ substituents | C₂H₄OC₂H₄OW¹ | H | violet |
| 264 | thiophene with CH₃, CN, NC, CH₃ substituents | C₃H₆OC₂H₄OW² | H | violet |
| 265 | thiophene with CH₃, CN, NC, CH₃ substituents | C₃H₆OC₄H₈OW¹ | H | violet |
| 266 | thiophene with CH₃, CN, OHC, CH₃ substituents | C₃H₆OC₄H₈OW¹ | H | violet |
| 267 | thiophene with CH₃, CN, OHC, CH₃ substituents | C₂H₄OC₂H₄OW¹ | H | violet |

TABLE 6-continued

| # | Structure | Col3 | Col4 | Color |
|---|---|---|---|---|
| 268 | 3-Cl, 4-CN, 2-CH₃, 5-CHO thiophene | $C_2H_4OC_2H_4OW^1$ | H | violet |
| 269 | 3-Cl, 4-CN, 2-CH₃, 5-CHO thiophene | $C_3H_6OC_4H_8OW^1$ | H | violet |
| 270 | 4-Cl, 5-CHO, 2-(N=C(CH₃)-) thiazole | $C_3H_6OC_4H_8OW^1$ | H | violet |
| 271 | 4-Cl, 5-CHO, 2-(N=C(CH₃)-) thiazole | $C_2H_4OC_2H_4OW^1$ | H | violet |
| 272 | 4-C₆H₅, 2-(N=C(CH₃)-) 1,3,4-thiadiazole | $C_2H_4OC_2H_4OW^1$ | H | reddish yellow |
| 273 | 2-CH₃, 3-CO₂CH₃, 5-NO₂ phenyl | $C_2H_4OC_2H_4OW^1$ | H | red |
| 274 | 3-Cl, 4-CH₃ phenylazophenyl | $C_2H_4OC_2H_4OW^1$ | H | red |
| 275 | 3-Cl, 4-CH₃ phenylazophenyl | $C_3H_6OC_4H_8OW^1$ | H | red |
| 276 | 3-Cl, 4-CH₃ phenylazophenyl | $C_3H_6OC_2H_4OW^2$ | H | red |
| 277 | anthraquinone | $C_2H_4OC_2H_4OW^1$ | H | brownish red |
| 278 | anthraquinone | $C_3H_6OC_4H_8OW^1$ | H | brownish red |

TABLE 6-continued

| # | Structure | | | |
|---|---|---|---|---|
| 279 | [anthraquinone with CH3] | $C_3H_6OC_2H_4OW^2$ | H | brownish red |
| 280 | [phenyl-N=N-phenyl with Br, CH3] | $C_2H_4OC_2H_4OW^1$ | H | red |
| 281 | [phenyl-N=N-phenyl with Br, CH3] | $C_3H_6OC_4H_8OW^1$ | H | red |
| 282 | [phenyl-N=N-phenyl with CN, CH3] | $C_2H_4OC_2H_4OW^1$ | H | bluish red |
| 283 | [phenyl-N=N-phenyl with CN, CH3] | $C_3H_6OC_4H_8OW^1$ | H | bluish red |
| 284 | [benzothiophene with CN, CH3] | $C_2H_4OC_2H_4OW^1$ | H | red |
| 285 | [benzisothiazole with $O_2N$, CH3] | $C_2H_4OC_2H_4OW^1$ | H | red |
| 286 | [thiophene with $CH_3$, CN, $C_2H_5O_2C$, CH3] | $C_2H_4OC_2H_4OW^1$ | H | bluish red |
| 287 | [phenyl-N=N-phenyl-CH3] | $C_2H_4OC_2H_4OW^1$ | H | reddish yellow |
| 288 | [$CH_3O$-phenyl-N=N-phenyl-CH3] | $C_2H_4OC_2H_4OW^1$ | H | reddish yellow |
| 289 | [$CH_3O$-phenyl-N=N-phenyl with Cl, CH3] | $C_2H_4OC_2H_4OW^1$ | H | red |
| 290 | [isothiazole with $C_6H_5-OCH_2$, CN, CH3] | $C_2H_4OC_2H_4OW^1$ | H | yellowish red |

TABLE 6-continued

| | | | | |
|---|---|---|---|---|
| 291 | CH₃, C=N-S, CN, CH₃ (isothiazole with CH₃, CN, CH₃) | $C_2H_4OC_2H_4OW^1$ | H | reddish yellow |
| 292 | CH₃, isothiazole, CN, CH₃ | $C_3H_6OC_2H_4OW^2$ | H | reddish yellow |
| 293 | C₆H₅—CH₂, isothiazole, CN, CH₃ | $C_2H_4OC_2H_4OW^1$ | H | yellowish red |
| 294 | C₆H₅—CH₂, isothiazole, CN, CH₃ | $C_3H_6OC_2H_4OW^2$ | H | yellowish red |
| 295 | C₆H₅—CH₂, isothiazole, CN, CH₃ | $C_2H_4OC_2H_4OW^1$ | $OCH_3$ | red |
| 296 | C₆H₅—CH₂, isothiazole, CN, CH₃ | $C_3H_6OC_2H_4OW^2$ | $OCH_3$ | red |
| 297 | C₆H₅, isothiazole, CN, CH₃ | $C_2H_4OC_2H_4OW^1$ | H | yellowish red |
| 298 | C₆H₅, isothiazole, CN, CH₃ | $C_3H_6OC_2H_4OW^2$ | H | yellowish red |
| 299 | C₆H₅, isothiazole, CN, CH₃ | $C_3H_6OC_2H_4OW^2$ | $OCH_3$ | red |
| 300 | C₆H₅, isothiazole, CN, CH₃ | $C_2H_4OC_2H_4OW^1$ | $OCH_3$ | red |
| 301 | thienyl-isothiazole, CN, CH₃ | $C_2H_4OC_2H_4OW^1$ | H | red |
| 302 | thienyl-isothiazole, CN, CH₃ | $C_3H_6OC_4H_8OW^1$ | H | red |

TABLE 6-continued

| # | Structure | | | |
|---|---|---|---|---|
| 303 | [thiophene-isothiazole-CN-CH3 structure] | $C_2H_4OC_2H_4OW^1$ | H | red |
| 304 | [thiophene-isothiazole-CN-CH3 structure] | $C_3H_6OC_2H_4OW^2$ | $OCH_3$ | red |
| 305 | $CH_3OC_2H_4$-[isothiazole-CN-CH3 structure] | $C_3H_6OC_2H_4OW^2$ | H | yellowish red |
| 306 | [3-Cl-phenyl-N=N-3-methylphenyl structure] | $C_3H_6OC_2H_4OW^2$ | H | yellowish red |
| 307 | [Cl, NC, N, S, isopropyl structure] | $C_3H_6OC_2H_4OW^2$ | H | red |

Similar results are obtained on using the mixtures listed in Table 6, which contain the dyes A and B in weight ratios of 30:70 and 40:60.

TABLE 7

Mixture of 30% of dye of the formula A

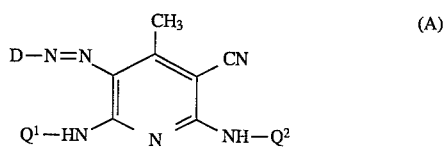

and 70% of dye of the formula B

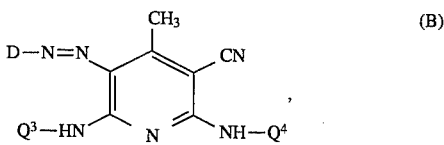

where

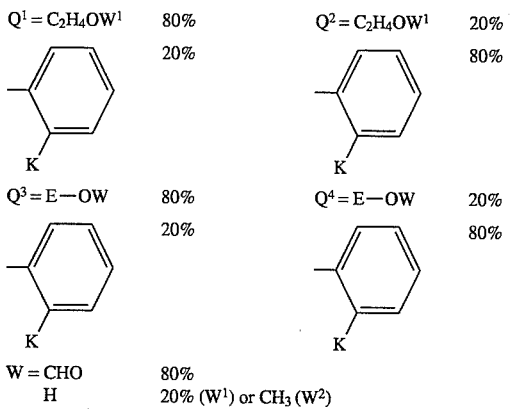

| $Q^1 = C_2H_4OW^1$ | 80% | $Q^2 = C_2H_4OW^1$ | 20% |
| tolyl-K | 20% | tolyl-K | 80% |
| $Q^3 = E-OW$ | 80% | $Q^4 = E-OW$ | 20% |
| tolyl-K | 20% | tolyl-K | 80% |
| W = CHO | 80% | | |
| H | 20% ($W^1$) or $CH_3$ ($W^2$) | | |

| Ex. No. | D | E—OW | K | Hue on polyester |
|---|---|---|---|---|
| 308 | phenyl-N=N-(thiophene with CN, CH3) | $C_2H_4OC_2H_4OW^1$ | H | reddish blue |
| 309 | phenyl-N=N-(thiophene with CN, CH3) | $C_3H_6OC_4H_8OW^1$ | H | reddish bue |
| 310 | phenyl-N=N-(thiophene with CN, CH3) | $C_3H_6OC_2H_4OW^2$ | H | reddish blue |
| 311 | phenyl-N=N-(thiophene with CN, CH3) | $C_3H_6O(C_2H_4O)_2W^2$ | H | reddish blue |
| 312 | phenyl-N=N-(thiophene with CN, CH3) | $C_2H_4OC_2H_4OW^1$ | $OCH_3$ | navy |

TABLE 7-continued
| # | Structure | | | |
|---|---|---|---|---|
| 313 | 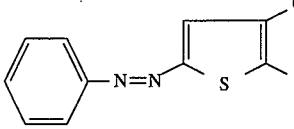 | $C_3H_6OC_4H_8OW^1$ | $OCH_3$ | navy |
| 314 | 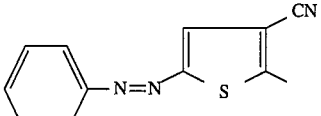 | $C_3H_6OC_2H_4OW^2$ | $OCH_3$ | navy |
| 315 | 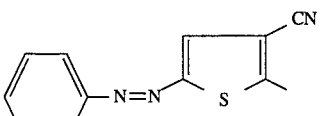 | $C_3H_6O(C_2H_4O)_2W^2$ | $OCH_3$ | navy |
| 316 | 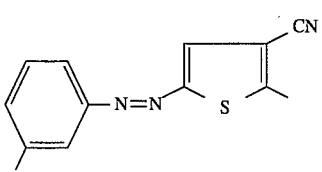 | $C_2H_4OC_2H_4OW^1$ | $OCH_3$ | navy |
| 317 | 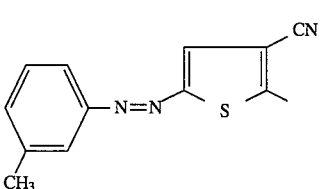 | $C_3H_6OC_2H_4OW^2$ | $OCH_3$ | navy |
| 318 | 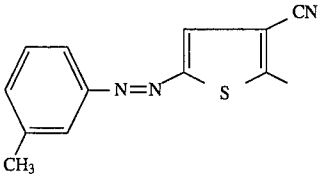 | $C_3H_6OC_4H_8OW^1$ | $OCH_3$ | navy |
| 319 | 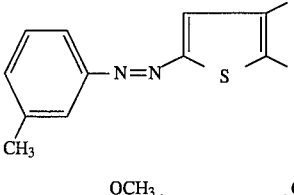 | $C_2H_4OC_2H_4OW^1$ | $OCH_3$ | navy |
| 320 | 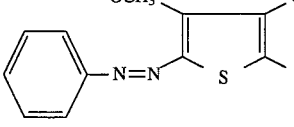 | $C_2H_4OC_2H_4OW^1$ | H | blue |
| 321 | 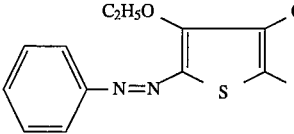 | $C_2H_4OC_2H_4OW^1$ | H | blue |

TABLE 7-continued

| # | Structure | | | Color |
|---|---|---|---|---|
| 322 | [thiophene with CH₃O, CN, azo to m-tolyl, CH₃] | $C_2H_4OC_2H_4OW^1$ | H | blue |
| 323 | [thiophene with CH₃O, CN, azo to m-tolyl, CH₃] | $C_2H_4OC_2H_4OW^1$ | $OCH_3$ | navy |
| 324 | [thiophene with CH₃, CN, CH₃O₂C, CH₃] | $C_2H_4OC_2H_4OW^1$ | H | bluish red |
| 325 | [thiophene with CH₃, CN, CH₃O₂C, CH₃] | $C_3H_6OC_2H_4OW^2$ | H | bluish red |
| 326 | [thiophene with CH₃, CN, CH₃O₂C, CH₃] | $C_3H_6OC_4H_8OW^1$ | H | bluish red |
| 327 | [thiophene with CH₃, CO₂CH₃, NC, CH₃] | $C_2H_4OC_2H_4OW^1$ | H | bordeaux |
| 328 | [thiophene with CH₃, CO₂CH₃, NC, CH₃] | $C_6H_6OW^1$ | H | bordeaux |
| 329 | [thiophene with CH₃, CO₂CH₃, NC, CH₃] | $C_3H_6OC_2H_4OW^2$ | H | bordeaux |
| 330 | [thiophene with CH₃, CO₂C₂H₅, NC, CH₃] | $C_2H_4OC_2H_4OW^1$ | H | bordeaux |
| 331 | [thiophene with CH₃, CN, NC, CH₃] | $C_2H_4OC_2H_4OW^1$ | H | violet |
| 332 | [thiophene with CH₃, CN, NC, CH₃] | $C_3H_6OC_2H_4OW^2$ | H | violet |
| 333 | [thiophene with CH₃, CN, NC, CH₃] | $C_3H_6OC_4H_8OW^1$ | H | violet |
| 334 | [thiophene with CH₃, CN, OHC, CH₃] | $C_3H_6OC_4H_8OW^1$ | H | violet |

TABLE 7-continued

| # | Structure | Col3 | Col4 | Color |
|---|---|---|---|---|
| 335 | 3-CH₃, 4-CN, 5-CHO, thiophene (2-methyl) | C₂H₄OC₂H₄OW¹ | H | violet |
| 336 | 3-Cl, 4-CN, 5-CHO, thiophene (2-methyl) | C₂H₄OC₂H₄OW¹ | H | violet |
| 337 | 3-Cl, 4-CN, 5-CHO, thiophene (2-methyl) | C₃H₆OC₄H₈OW¹ | H | violet |
| 338 | Cl, CHO, thiazole (isopropylidene) | C₃H₆OC₄H₈OW¹ | H | violet |
| 339 | Cl, CHO, thiazole (isopropylidene) | C₂H₄OC₂H₄OW¹ | H | violet |
| 340 | C₆H₅, thiadiazole (isopropylidene) | C₂H₄OC₂H₄OW¹ | H | reddish yellow |
| 341 | 2-CH₃, 3-CO₂CH₃, 5-NO₂ phenyl | C₂H₄OC₂H₄OW¹ | H | red |
| 342 | 3-Cl, 4-CH₃ phenylazo phenyl | C₂H₄OC₂H₄OW¹ | H | red |
| 343 | 3-Cl, 4-CH₃ phenylazo phenyl | C₃H₆OC₄H₈OW¹ | H | red |
| 346 | 3-Cl, 4-CH₃ phenylazo phenyl | C₃H₆OC₂H₄OW² | H | red |
| 347 | 1-methyl anthraquinone | C₂H₄OC₂H₄OW¹ | H | brownish red |

TABLE 7-continued

| No. | Structure | R | R' | Color |
|---|---|---|---|---|
| 348 | anthraquinone | $C_3H_6OC_4H_8OW^1$ | H | brownish red |
| 349 | anthraquinone | $C_3H_6OC_2H_4OW^2$ | H | brownish red |
| 350 | phenyl-N=N-(3-Br, 4-methyl)phenyl | $C_2H_4OC_2H_4OW^1$ | H | red |
| 351 | phenyl-N=N-(3-Br, 4-methyl)phenyl | $C_3H_6OC_4H_8OW^1$ | H | red |
| 352 | phenyl-N=N-(3-CN, 4-methyl)phenyl | $C_2H_4OC_2H_4OW^1$ | H | bluish red |
| 353 | phenyl-N=N-(3-CN, 4-methyl)phenyl | $C_3H_6OC_4H_8OW^1$ | H | bluish red |
| 354 | 3-CN-2-methyl-benzothiophene | $C_2H_4OC_2H_4OW^1$ | H | red |
| 355 | 7-nitro-4-methyl-benzisothiazole | $C_2H_4OC_2H_4OW^1$ | H | red |
| 356 | 3-methyl-4-CN-5-methyl-2-ethoxycarbonyl-thiophene | $C_2H_4OC_2H_4OW^1$ | H | bluish red |
| 357 | phenyl-N=N-(4-methyl)phenyl | $C_2H_4OC_2H_4OW^1$ | H | reddish yellow |
| 358 | 4-methoxyphenyl-N=N-(4-methyl)phenyl | $C_2H_4OC_2H_4OW^1$ | H | reddish yellow |

TABLE 7-continued

| | | | | | |
|---|---|---|---|---|---|
| 359 | 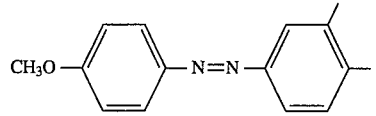 | Cl | C₂H₄OC₂H₄OW¹ | H | red |
| 360 | 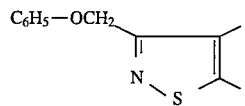 | CN | C₂H₄OC₂H₄OW¹ | H | yellowish red |
| 361 | 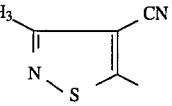 | CN | C₂H₄OC₂H₄OW¹ | H | reddish yellow |
| 362 | 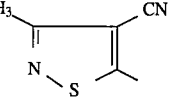 | CN | C₃H₆OC₂H₄OW² | H | reddish yellow |
| 363 | 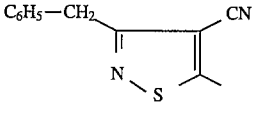 | CN | C₂H₄OC₂H₄OW¹ | H | yellowish red |
| 364 | 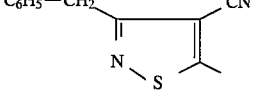 | CN | C₃H₆OC₂H₄OW² | H | yellowish red |
| 365 | 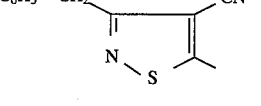 | CN | C₂H₄OC₂H₄OW¹ | OCH₃ | red |
| 366 | 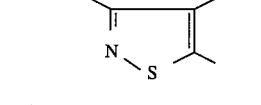 | CN | C₃H₆OC₂H₄OW² | OCH₃ | red |
| 367 | 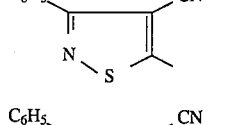 | CN | C₂H₄OC₂H₄OW¹ | H | yellowish red |
| 368 | 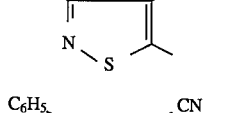 | CN | C₃H₆OC₂H₄OW² | H | yellowish red |
| 369 | 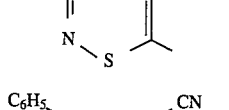 | CN | C₃H₆OC₂H₄OW² | OCH₃ | red |
| 370 | 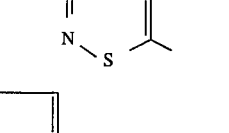 | CN | C₂H₄OC₂H₄OW¹ | OCH₃ | red |
| 371 | 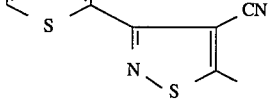 | CN | C₂H₄OC₂H₄OW¹ | H | red |

TABLE 7-continued

| # | Structure | | | |
|---|---|---|---|---|
| 372 | (thiophene-isothiazole with CN, CH3) | $C_3H_6OC_4H_8OW^1$ | H | red |
| 373 | (thiophene-isothiazole with CN, CH3) | $C_2H_4OC_2H_4OW^1$ | H | red |
| 374 | (thiophene-isothiazole with CN, CH3) | $C_3H_6OC_2H_4OW^2$ | $OCH_3$ | red |
| 375 | $CH_3OC_2H_4$-isothiazole with CN, CH3 | $C_3H_6OC_2H_4OW^2$ | H | yellowish red |
| 376 | Cl-phenyl-N=N-tolyl (CH3) | $C_3H_6OC_2H_4OW^2$ | H | yellowish red |
| 377 | Cl, NC, N, S structure | $C_3H_6OC_2H_4OW^2$ | H | red |

Similar results are obtained on using the mixtures listed in Table 7, which contain the dyes A and B in weight ratios of 35:65 and 40:60.

TABLE 8

Mixture of 35% of dye of the formula A

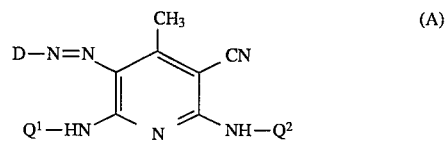
(A)

and 65% of dye of the formula B

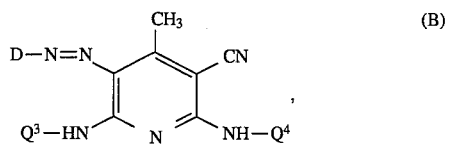
(B)

where

| | | | |
|---|---|---|---|
| $Q^1 = C_3H_6OW^1$ | 80% | $Q^2 = C_3H_6OW^1$ | 20% |
| (phenyl-K) | 20% | (phenyl-K) | 80% |
| $Q^3 = E{-}OW$ | 80% | $Q^4 = E{-}OW$ | 20% |
| (phenyl-K) | 20% | (phenyl-K) | 80% |
| $W = CHO$ | 80% ($W^1$), | $CH_3$ $C_2H_5CO$ | 80% |
| H | 20% ($W^2$) or | H | 20% ($W^3$) |

| Ex. No. | D | E—OW | K | Hue on polyester |
|---|---|---|---|---|
| 378 | CH₃-isothiazole-CN | $C_2H_4OC_2H_4OW^1$ | H | reddish yellow |
| 379 | CH₃-isothiazole-CN | $C_3H_6OC_2H_4OW^2$ | H | reddish yellow |
| 380 | $C_6H_5{-}CH_2$-isothiazole-CN | $C_2H_4OC_2H_4OW^1$ | H | yellowish red |
| 381 | $C_6H_5{-}CH_2$-isothiazole-CN | $C_3H_6OC_2H_4OW^2$ | H | yellowish red |
| 382 | $C_6H_5{-}CH_2$-isothiazole-CN | $C_2H_4OC_2H_4OW^1$ | $OCH_3$ | red |
| 383 | $C_6H_5{-}CH_2$-isothiazole-CN | $C_3H_6OC_2H_4OW^2$ | $OCH_3$ | red |

TABLE 8-continued

| # | Structure | | | |
|---|---|---|---|---|
| 384 | 3-C$_6$H$_5$, 4-CN, 5-CH$_3$ isothiazole | C$_2$H$_4$OC$_2$H$_4$OW$^1$ | H | yellowish red |
| 385 | 3-C$_6$H$_5$, 4-CN, 5-CH$_3$ isothiazole | C$_3$H$_6$OC$_2$H$_4$OW$^2$ | H | yellowish red |
| 386 | 3-C$_6$H$_5$, 4-CN, 5-CH$_3$ isothiazole | C$_3$H$_6$OC$_2$H$_4$OW$^2$ | OCH$_3$ | red |
| 387 | 3-C$_6$H$_5$, 4-CN, 5-CH$_3$ isothiazole | C$_2$H$_4$OC$_2$H$_4$OW$^1$ | OCH$_3$ | red |
| 388 | 3-(2-thienyl), 4-CN, 5-CH$_3$ isothiazole | C$_2$H$_4$OC$_2$H$_4$OW$^1$ | H | red |
| 389 | 3-(2-thienyl), 4-CN, 5-CH$_3$ isothiazole | C$_3$H$_6$OC$_4$H$_8$OW$^1$ | H | red |
| 390 | 3-(3-thienyl), 4-CN, 5-CH$_3$ isothiazole | C$_2$H$_4$OC$_2$H$_4$OW$^1$ | H | red |
| 391 | 3-(2-thienyl), 4-CN, 5-CH$_3$ isothiazole | C$_3$H$_6$OC$_2$H$_4$OW$^2$ | OCH$_3$ | red |
| 392 | 3-(CH$_3$OC$_2$H$_4$), 4-CN, 5-CH$_3$ isothiazole | C$_3$H$_6$OC$_2$H$_4$OW$^2$ | H | yellowish red |
| 393 | 3-chlorophenyl-N=N-(3-methyl-4-yl)phenyl | C$_3$H$_6$OC$_2$H$_4$OW$^2$ | H | yellowish red |
| 394 | 3-Cl, 4-CN, 5-(=C(CH$_3$)) isothiazole | C$_3$H$_6$OC$_2$H$_4$OW$^2$ | H | red |
| 395 | 2-CO$_2$CH$_3$, 5-O$_2$N phenyl | C$_2$H$_4$OC$_2$H$_4$OW$^1$ | H | red |

TABLE 8-continued

| # | Structure | R | X | Color |
|---|---|---|---|---|
| 396 | Ph-N=N-C6H3(Cl)- | $C_2H_4OC_2H_4OW^1$ | H | red |
| 397 | Ph-N=N-C6H3(Cl)- | $C_3H_6OC_4H_8OW^1$ | H | red |
| 398 | Ph-N=N-C6H3(Cl)- | $C_3H_6OC_2H_4OW^2$ | H | red |
| 399 | anthraquinone | $C_2H_4OC_2H_4OW^1$ | H | brownish red |
| 400 | anthraquinone | $C_3H_6OC_4H_8OW^1$ | H | brownish red |
| 401 | anthraquinone | $C_4H_8OW^1$ | H | brownish red |
| 402 | anthraquinone | $C_3H_6OC_2H_4OW^2$ | H | brownish red |
| 403 | Ph-N=N-C6H3(Br)- | $C_2H_4OC_2H_4OW^1$ | H | red |
| 404 | Ph-N=N-C6H3(Br)- | $C_3H_6OC_4H_8OW^1$ | H | red |
| 405 | Ph-N=N-C6H3(CN)- | $C_2H_4OC_2H_4OW^1$ | H | bluish red |

TABLE 8-continued
| | | | | |
|---|---|---|---|---|
| 406 | 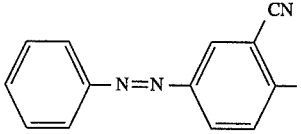 CN | C₃H₆OC₄H₈OW¹ | H | bluish red |
| 407 | 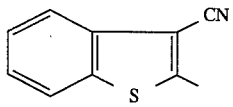 CN | C₂H₄OC₂H₄OW¹ | H | red |
| 408 | 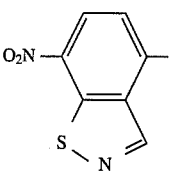 | C₂H₄OC₂H₄OW¹ | H | red |
| 409 | 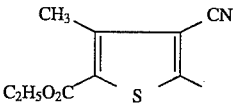 | C₂H₄OC₂H₄OW¹ | H | bluish red |
| 410 | 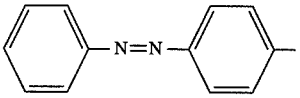 | C₂H₄OC₂H₄OW¹ | H | reddish yellow |
| 411 | 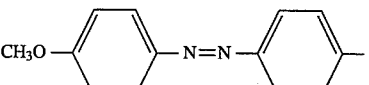 | C₂H₄OC₂H₄OW¹ | H | reddish yellow |
| 412 | 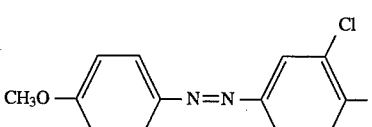 Cl | C₂H₄OC₂H₄OW¹ | H | red |
| 413 | 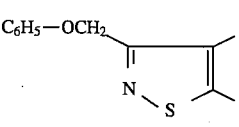 | C₂H₄OC₂H₄OW¹ | H | yellowish red |
| 414 | 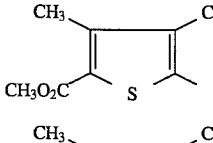 | C₂H₄OC₂H₄OW¹ | H | bluish red |
| 415 | 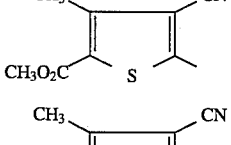 | C₃H₆OC₂H₄OW² | H | bluish red |
| 416 | 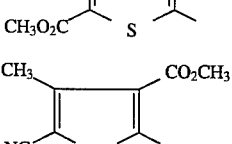 | C₃H₆OC₄H₈OW¹ | H | bluish red |
| 417 | 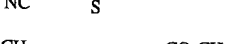 | C₂H₄OC₂H₄OW¹ | H | bordeaux |
| 418 | 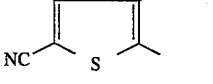 | C₃H₆OW³ | H | bordeaux |

TABLE 8-continued

| | | | | |
|---|---|---|---|---|
| 419 | 3-CH₃, 4-CO₂CH₃, 5-CN, thiophen-2-yl (2-position attachment) | $C_3H_6OC_2H_4OW^2$ | H | bordeaux |
| 420 | 3-CH₃, 4-CO₂C₂H₅, 5-CN, thiophen-2-yl | $C_2H_4OC_2H_4OW^1$ | H | bordeaux |
| 421 | 3-CH₃, 4-CN, 5-CN, thiophen-2-yl | $C_2H_4OC_2H_4OW^1$ | H | violet |
| 422 | 3-CH₃, 4-CN, 5-CN, thiophen-2-yl | $C_3H_6OC_2H_4OW^2$ | H | violet |
| 423 | 3-CH₃, 4-CN, 5-CN, thiophen-2-yl | $C_3H_6OC_4H_8OW^1$ | H | violet |
| 424 | 3-CH₃, 4-CN, 5-CHO, thiophen-2-yl | $C_3H_6OC_4H_8OW^1$ | H | violet |
| 425 | 3-CH₃, 4-CN, 5-CHO, thiophen-2-yl | $C_2H_4OC_2H_4OW^1$ | H | violet |
| 426 | 3-Cl, 4-CN, 5-CHO, thiophen-2-yl | $C_2H_4OC_2H_4OW^1$ | H | violet |
| 427 | 3-Cl, 4-CN, 5-CHO, thiophen-2-yl | $C_3H_6OC_4H_8OW^1$ | H | violet |
| 428 | Cl, CHO, thiazol-2-yl | $C_3H_6OC_4H_8OW^1$ | H | violet |
| 429 | Cl, CHO, thiazol-2-yl | $C_2H_4OC_2H_4OW^1$ | H | violet |
| 430 | C₆H₅, 1,3,4-thiadiazol-2-yl | $C_2H_4OC_2H_4OW^1$ | H | reddish yellow |
| 431 | 5-(phenylazo)-2-methyl-3-cyano-thiophen-2-yl | $C_2H_4OC_2H_4OW^1$ | H | reddish blue |

TABLE 8-continued

| No. | Structure | | R | Color |
|---|---|---|---|---|
| 432 | [phenyl-N=N-thiophene(CN, CH₃)] | C₃H₆OC₄H₈OW¹ | H | reddish blue |
| 433 | [phenyl-N=N-thiophene(CN, CH₃)] | C₃H₆OC₂H₄OW² | H | reddish blue |
| 434 | [phenyl-N=N-thiophene(CN, CH₃)] | C₃H₆O(C₂H₄O)₂W² | H | reddish blue |
| 435 | [phenyl-N=N-thiophene(CN, CH₃)] | C₂H₄OC₂H₄OW¹ | OCH₃ | navy |
| 436 | [phenyl-N=N-thiophene(CN, CH₃)] | C₃H₆OC₄H₈OW¹ | OCH₃ | navy |
| 437 | [phenyl-N=N-thiophene(CN, CH₃)] | C₃H₆OC₂H₄OW² | OCH₃ | navy |
| 438 | [phenyl-N=N-thiophene(CN, CH₃)] | C₃H₆O(C₂H₄O)₂W² | OCH₃ | navy |
| 439 | [3-CH₃-phenyl-N=N-thiophene(CN, CH₃)] | C₂H₄OC₂H₄OW¹ | OCH₃ | navy |
| 440 | [3-CH₃-phenyl-N=N-thiophene(CN, CH₃)] | C₃H₆OC₂H₄OW² | OCH₃ | navy |
| 441 | [3-CH₃-phenyl-N=N-thiophene(CN, CH₃)] | C₃H₆OC₄H₈OW¹ | OCH₃ | navy |

TABLE 8-continued

| # | Structure | | | |
|---|---|---|---|---|
| 442 | 2,5-dimethylphenyl-N=N-[thiophene with CN, CH3] | $C_2H_4OC_2H_4OW^1$ | $OCH_3$ | navy |
| 443 | phenyl-N=N-[thiophene with OCH3, CN, CH3] | $C_2H_4OC_2H_4OW^1$ | H | blue |
| 444 | phenyl-N=N-[thiophene with $C_2H_5O$, CN, CH3] | $C_2H_4OC_2H_4OW^1$ | H | blue |
| 445 | 3-methylphenyl-N=N-[thiophene with $CH_3O$, CN, CH3] | $C_2H_4OC_2H_4OW^1$ | H | blue |
| 446 | 3-methylphenyl-N=N-[thiophene with $CH_3O$, CN, CH3] | $C_2H_4OC_2H_4OW^1$ | $OCH_3$ | navy |

Similar results are obtained on using the mixtures listed in Table 8, which contain the dyes A and B in weight ratios of 30:70, 40:60 and 45:55.

TABLE 9
Mixture of 40% of dye of the formula A
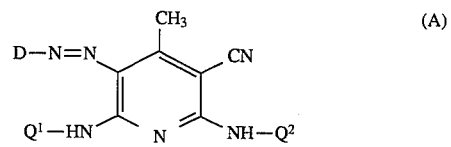 (A)
and 60% of dye of the formula B
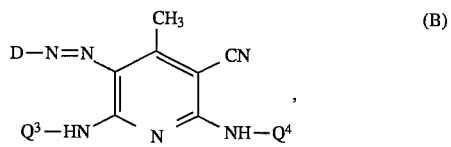 (B)
where
| | | | | |
|---|---|---|---|---|
| $Q^1 = C_2H_4OC_2H_4OW^1$ | 80% | | $Q^2 = C_2H_4OC_2H_4OW^1$ | 20% |
| 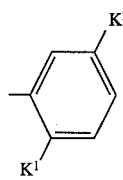 | 20% | | 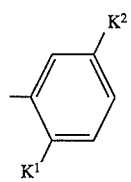 | 80% |
| $Q^3 = E-OW$ | 80% | | $Q^4 = E-OW$ | 20% |
| 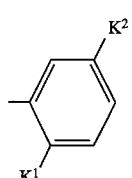 | 20% | | 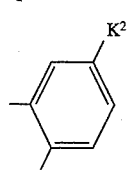 | 80% |
| W = CHO | 80% | | | |
| H | 20% ($W^1$), $CH_3$ ($W^2$) or $C_2H_5$ ($W^3$) | | | |
| Ex. No. | D | E—OW | $K^1$ | $K^2$ | Hue on polyester |
|---|---|---|---|---|---|
| 447 | 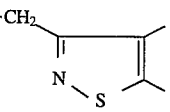 | $C_3H_6OC_4H_8OW^1$ | H | H | yellowish red |
| 448 | 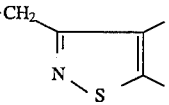 | $C_3H_6OC_4H_8OW^1$ | H | $CH_3$ | yellowish red |
| 449 | 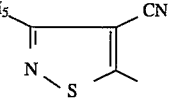 | $C_3H_6OC_4H_8OW^1$ | H | H | red |
| 450 | 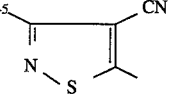 | $C_3H_6OC_4H_8OW^1$ | H | $CH_3$ | red |
| 451 | 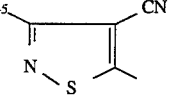 | $C_3H_6OC_4H_8OW^1$ | $OCH_3$ | H | bluish red |

TABLE 9-continued

| | | | | | |
|---|---|---|---|---|---|
| 452 | C₆H₅–C(=N-S-)–C(CN)= (isothiazole with C₆H₅, CN) | $C_3H_6OC_2H_4OW^2$ | H | H | red |
| 453 | 3-thienyl isothiazole with CN | $C_3H_6OC_4H_8OW^1$ | H | H | red |
| 454 | phenyl–N=N–(2-Cl,4-)phenyl | $C_3H_6OC_4H_8OW^1$ | H | H | red |
| 455 | phenyl–N=N–(2-Cl,4-)phenyl | $C_3H_6OC_4H_8OW^1$ | H | $CH_3$ | red |
| 456 | (3-Cl)phenyl–N=N–(2-CH₃,4-)phenyl | $C_3H_6OC_4H_8OW^1$ | H | H | yellowish red |
| 457 | phenyl–N=N–(2-CN,4-)phenyl | $C_3H_6OC_4H_8OW^1$ | H | H | bluish red |
| 458 | phenyl–N=N–(2-Cl,4-)phenyl | $C_4H_8OW^1$ | H | H | red |
| 459 | 1-methylanthraquinone | $C_3H_6OC_4H_8OW^1$ | H | H | brownish red |
| 460 | phenyl–N=N–thiophene(CN) | $C_3H_6OC_2H_4OW^3$ | $OCH_3$ | H | navy |
| 461 | phenyl–N=N–thiophene(CN) | $C_3H_6OC_2H_4OC_2H_4OW^2$ | $OCH_3$ | H | navy |

TABLE 9-continued
| | | | | | |
|---|---|---|---|---|---|
| 462 | 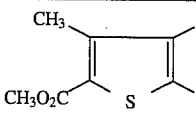 | $C_3H_6OC_4H_8OW^1$ | H | H | bluish red |
| 462 | 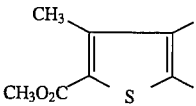 | $C_3H_6OC_4H_8OW^1$ | H | H | bluish red |
| 463 | 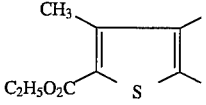 | $C_3H_6OC_4H_8OW^1$ | H | H | bluish red |
| 464 | 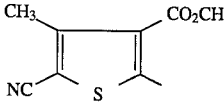 | $C_3H_6OC_4H_8OW^1$ | H | H | bluish red |
| 465 | 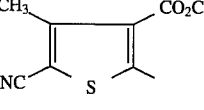 | $C_3H_6OC_4H_8OW^1$ | H | H | bluish red |
| 466 | 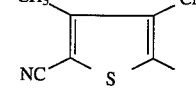 | $C_3H_6OC_4H_8OW^1$ | H | H | bluish red |
| 467 | 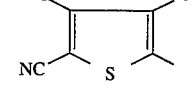 | $C_4H_8OW^1$ | H | H | bluish red |
| 468 | 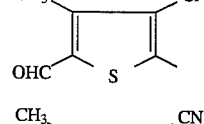 | $C_3H_6OC_4H_8OW^1$ | H | H | violet |
| 469 | 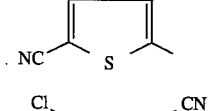 | $C_3H_6OC_4H_8OW^1$ | H | $CH_3$ | bordeaux |
| 470 | 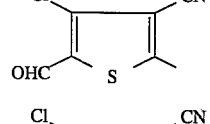 | $C_3H_6OC_4H_8OW^1$ | H | H | violet |
| 471 | 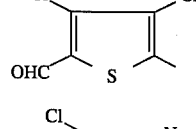 | $C_3H_6OC_4H_8OW^1$ | H | $CH_3$ | violet |
| 472 | 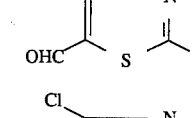 | $C_3H_6OC_4H_8OW^1$ | H | H | bluish red |
| 473 | 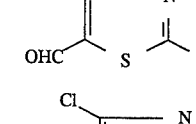 | $C_3H_6OC_4H_8OW^1$ | H | $CH_3$ | bluish red |
| 474 | 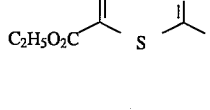 | $C_3H_6OC_4H_8OW^1$ | H | H | red |

TABLE 9-continued

| # | Structure | | R | R' | Color |
|---|---|---|---|---|---|
| 475 | (CH₃, CN-substituted thiazole with N=C(CH₃)) | C₃H₆OC₄H₈OW¹ | H | H | red |
| 476 | (C₂H₅O₂C, CN-substituted thiazole with N=C(CH₃)) | C₃H₆OC₄H₈OW¹ | H | CH₃ | red |
| 477 | Ph-N=N-(thiophene, CN, CH₃) | C₃H₆OC₄H₈OW¹ | H | H | reddish blue |
| 478 | Ph-N=N-(thiophene, CN, CH₃) | C₃H₆OC₄H₈OW¹ | OCH₃ | H | navy |
| 479 | (3-CH₃-Ph)-N=N-(thiophene, CN, CH₃) | C₃H₆OC₄H₈OW¹ | H | H | reddish blue |
| 480 | (3-CH₃-Ph)-N=N-(thiophene, CN, CH₃) | C₃H₆OC₄H₈OW¹ | OCH₃ | H | navy |
| 481 | (2,5-diCH₃-Ph)-N=N-(thiophene, CN, CH₃) | C₃H₆OC₄H₈OW¹ | H | H | blue |
| 482 | (2,5-diCH₃-Ph)-N=N-(thiophene, CN, CH₃) | C₃H₆OC₄H₈OW¹ | OCH₃ | H | greenish navy |
| 483 | (3-CH₃-Ph)-N=N-(thiophene, CN, CH₃) | C₃H₆OC₂H₄OW² | OCH₃ | H | navy |
| 484 | Ph-N=N-(thiophene, CN, CH₃) | C₃H₆OC₄H₈OW¹ | H | CH₃ | reddish blue |

TABLE 9-continued

| 485 | 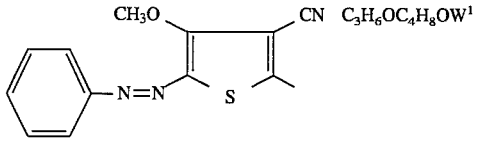 | H | H | blue |
|---|---|---|---|---|
| 486 | 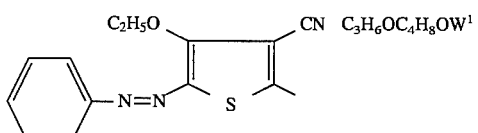 | H | H | blue |

Similar results are obtained on using the mixtures listed in Table 9, which contain the dyes A and B in a weight ratio of 30:70.

TABLE 10

Mixture of 60% of dye of the formula A

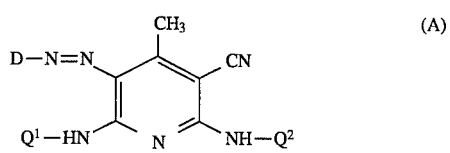 (A)

and 40% of the dye of the formula B

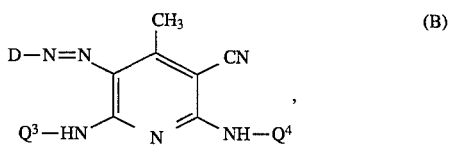 (B)

where:

| $Q^1$ = $C_3H_6OC_2H_4OW^2$ 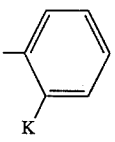 K | 80% 20% | $Q^2$ = $C_3H_6OC_2H_4OW^2$ 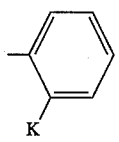 K | 20% 80% |
|---|---|---|---|
| $Q^3$ = E—OW 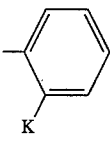 K | 80% 20% | $Q^4$ = E—OW 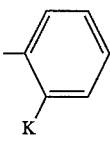 K | 20% 80% |
| W = CHO H | 80% 20% ($W^1$), $CH_3$ ($W^2$) or $C_2H_5$ ($W^3$) | | |

| Ex. No. | D | E—OW | K | Hue on polyester |
|---|---|---|---|---|
| 487 | 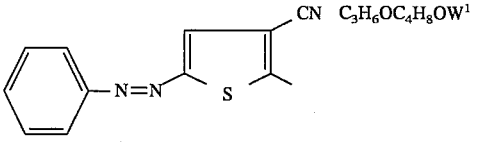 | $C_3H_6OC_4H_8OW^1$ | H | reddish blue |

TABLE 10-continued

| # | Structure | | | |
|---|---|---|---|---|
| 488 | phenyl-N=N-[thiophene with CN, CH₃] | $C_3H_6OC_4H_8OW^1$ | $OCH_3$ | navy |
| 489 | 3-methylphenyl-N=N-[thiophene with CN, CH₃] | $C_3H_6OC_4H_8OW^1$ | H | reddish blue |
| 490 | 3-methylphenyl-N=N-[thiophene with CN, CH₃] | $C_3H_6OC_4H_8OW^1$ | $OCH_3$ | navy |
| 491 | 2,5-dimethylphenyl-N=N-[thiophene with CN, CH₃] | $C_3H_6OC_4H_8OW^1$ | H | blue |
| 492 | 2,5-dimethylphenyl-N=N-[thiophene with CN, CH₃] | $C_3H_6OC_4H_8OW^1$ | $OCH_3$ | greenish navy |
| 493 | 3-methylphenyl-N=N-[thiophene with CN, CH₃] | $C_3H_6O(C_2H_4O)_2W^2$ | $OCH_3$ | navy |
| 494 | phenyl-N=N-[thiophene with OCH₃, CN, CH₃] | $C_3H_6OC_4H_8OW^1$ | H | blue |
| 495 | 3-methylphenyl-N=N-[thiophene with OC₂H₅, CN, CH₃] | $C_3H_6OC_4H_8OW^1$ | H | blue |
| 496 | [thiophene with CH₃, CN, CH₃O₂C, CH₃] | $C_3H_6OC_4H_8OW^1$ | H | bluish red |
| 497 | [thiophene with CH₃, CN, C₂H₅O₂C, CH₃] | $C_3H_6OC_4H_8OW^1$ | H | bluish red |

TABLE 10-continued

| No. | Structure | R | R' | Color |
|---|---|---|---|---|
| 498 | CH₃, CO₂CH₃ on thiophene with NC, CH₃ | C₃H₆OC₄H₈OW¹ | H | bluish red |
| 499 | CH₃, CO₂C₂H₅ on thiophene with NC, CH₃ | C₃H₆OC₄H₈OW¹ | H | bluish red |
| 500 | CH₃, CN on thiophene with NC, CH₃ | C₃H₆OC₄H₈OW¹ | H | bluish red |
| 501 | CH₃, CN on thiophene with NC, CH₃ | C₄H₈OW¹ | H | bluish red |
| 502 | CH₃, CN on thiophene with OHC, CH₃ | C₃H₆OC₄H₈OW¹ | H | violet |
| 503 | Cl, CN on thiophene with OHC, CH₃ | C₃H₆OC₄H₈OW¹ | H | violet |
| 504 | Br, CN on thiophene with OHC, CH₃ | C₃H₆OC₄H₈OW¹ | H | violet |
| 505 | Cl, N on thiazole with OHC, CH₃ | C₃H₆OC₄H₈OW¹ | H | bluish red |
| 506 | Cl, N on thiazole with C₂H₅O₂C, CH₃ | C₃H₆OC₄H₈OW¹ | H | red |
| 507 | CH₃, N on thiazole with NC, CH₃ | C₃H₆OC₄H₈OW¹ | H | red |
| 508 | C₂H₅O₂C, N on thiazole with NC, CH₃ | C₃H₆OC₄H₈OW¹ | H | red |
| 509 | C₆H₅—CH₂, CN on isothiazole with CH₃ | C₃H₆OC₄H₈OW¹ | H | yellowish red |
| 510 | C₆H₅, CN on isothiazole with CH₃ | C₃H₆OC₄H₈OW¹ | H | red |
| 511 | C₆H₅, CN on isothiazole with CH₃ | C₃H₆OC₄H₈OW¹ | OCH₃ | bluish red |

TABLE 10-continued

| # | Structure | Col3 | Col4 | Color |
|---|---|---|---|---|
| 512 | 3-thienyl-isothiazole with CN and CH3 substituents | $C_3H_6OC_4H_8OW^1$ | H | red |
| 513 | phenyl-N=N-(2-Cl-phenyl) | $C_3H_6OC_4H_8OW^1$ | H | red |
| 514 | (3-CH3-phenyl)-N=N-(2-Cl-phenyl) | $C_3H_6OC_4H_8OW^1$ | H | red |
| 515 | (3-Cl-phenyl)-N=N-(2-CH3-phenyl) | $C_3H_6OC_4H_8OW^1$ | H | yellowish red |
| 516 | phenyl-N=N-(2-CN-phenyl) | $C_3H_6OC_4H_8OW^1$ | H | bluish red |
| 517 | phenyl-N=N-(2-CN-phenyl) | $C_4H_8OW^1$ | H | red |
| 518 | anthraquinone | $C_3H_6OC_4H_8OW^1$ | H | brownish red |
| 519 | phenyl-N=N-(thiophene with CN and CH3) | $C_3H_6OC_2H_4OW^3$ | $OCH_3$ | navy |
| 520 | phenyl-N=N-(thiophene with CN and CH3) | $C_3H_6OC_2H_4OC_2H_4OW^2$ | $OCH_3$ | navy |

Similar results are obtained on using the mixtures listed in Table 10, which contain the dyes A and B in weight ratios of 70:30 and 65:35.

Similar results are also obtained with the following dye mixtures:

EXAMPLE 521

| Structure | % |
|---|---|
| Ph–N=N–(2-Cl-C₆H₃)–N=N–[pyridine: 4-CH₃, 3-CN, 2-NH–C₂H₄OC₂H₄OCHO, 6-N=, 5-NH–C₆H₅] | 9.35% |
| Ph–N=N–(2-Cl-C₆H₃)–N=N–[pyridine: 4-CH₃, 3-CN, 2-NH–C₃H₆OC₄H₈OCHO, 6-N=, 5-NH–C₆H₅] | 7.65% |
| Ph–N=N–(2-Cl-C₆H₃)–N=N–[pyridine: 4-CH₃, 3-CN, 2-NH–C₆H₅, 6-N=, 5-NH–C₂H₄OC₂H₄OCHO] | 37.4% |
| Ph–N=N–(2-Cl-C₆H₃)–N=N–[pyridine: 4-CH₃, 3-CN, 2-NH–C₆H₅, 6-N=, 5-NH–C₃H₆OC₄H₈OCHO] | 30.6% |
| Ph–N=N–(2-Cl-C₆H₃)–N=N–[pyridine: 4-CH₃, 3-CN, 2-NH–C₂H₄OC₂H₄OH, 6-N=, 5-NH–C₆H₅] | 1.65% |
| Ph–N=N–(2-Cl-C₆H₃)–N=N–[pyridine: 4-CH₃, 3-CN, 2-NH–C₃H₆OC₄H₈OH, 6-N=, 5-NH–C₆H₅] | 1.35% |
| Ph–N=N–(2-Cl-C₆H₃)–N=N–[pyridine: 4-CH₃, 3-CN, 2-NH–C₆H₅, 6-N=, 5-NH–C₂H₄OC₂H₄OH] | 6.6% |
| Ph–N=N–(2-Cl-C₆H₃)–N=N–[pyridine: 4-CH₃, 3-CN, 2-NH–C₆H₅, 6-N=, 5-NH–C₃H₆OC₄H₈OH] | 5.4% |

Hue on polyester: red

EXAMPLE 522
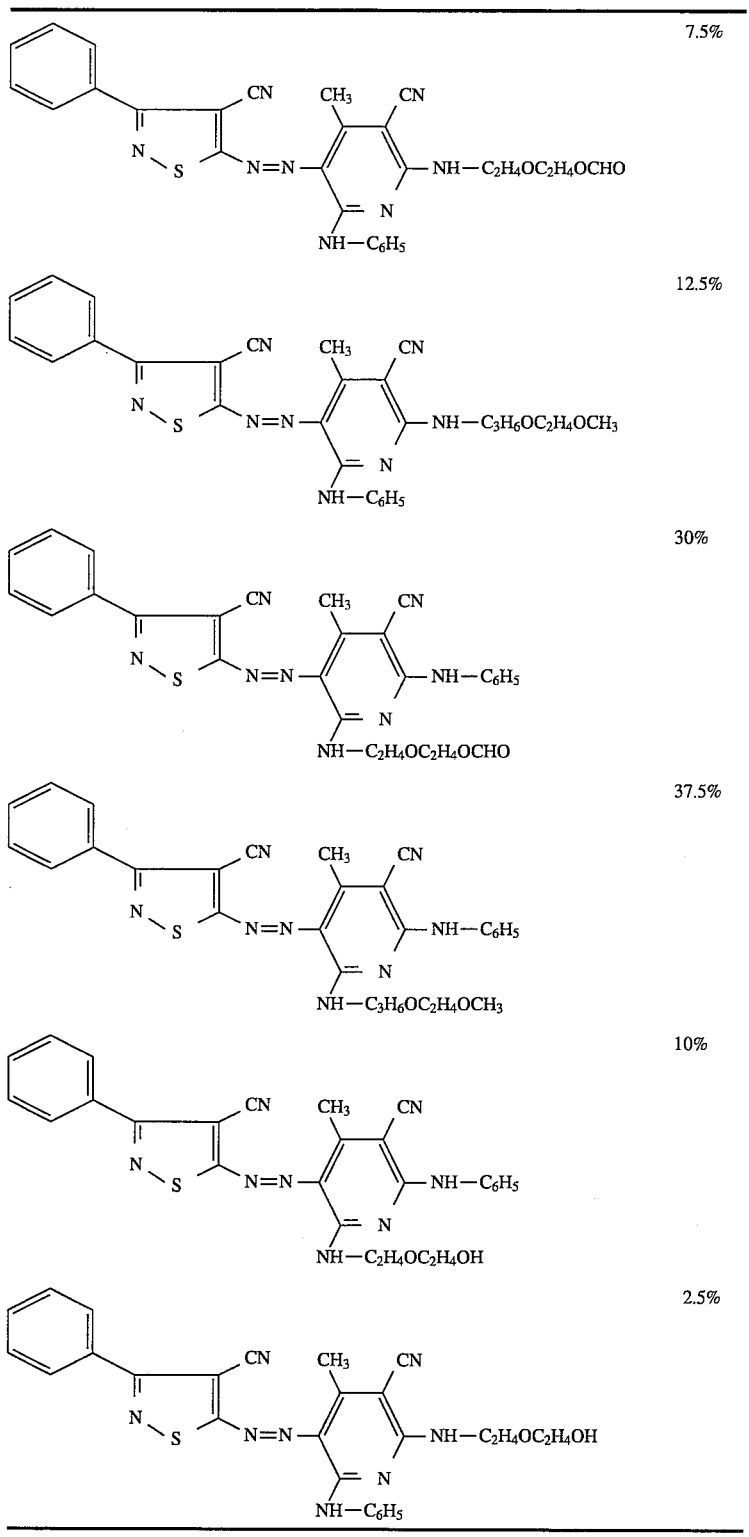
| | |
|---|---|
| | 7.5% |
| | 12.5% |
| | 30% |
| | 37.5% |
| | 10% |
| | 2.5% |
Hue on polyester: red

EXAMPLE 523
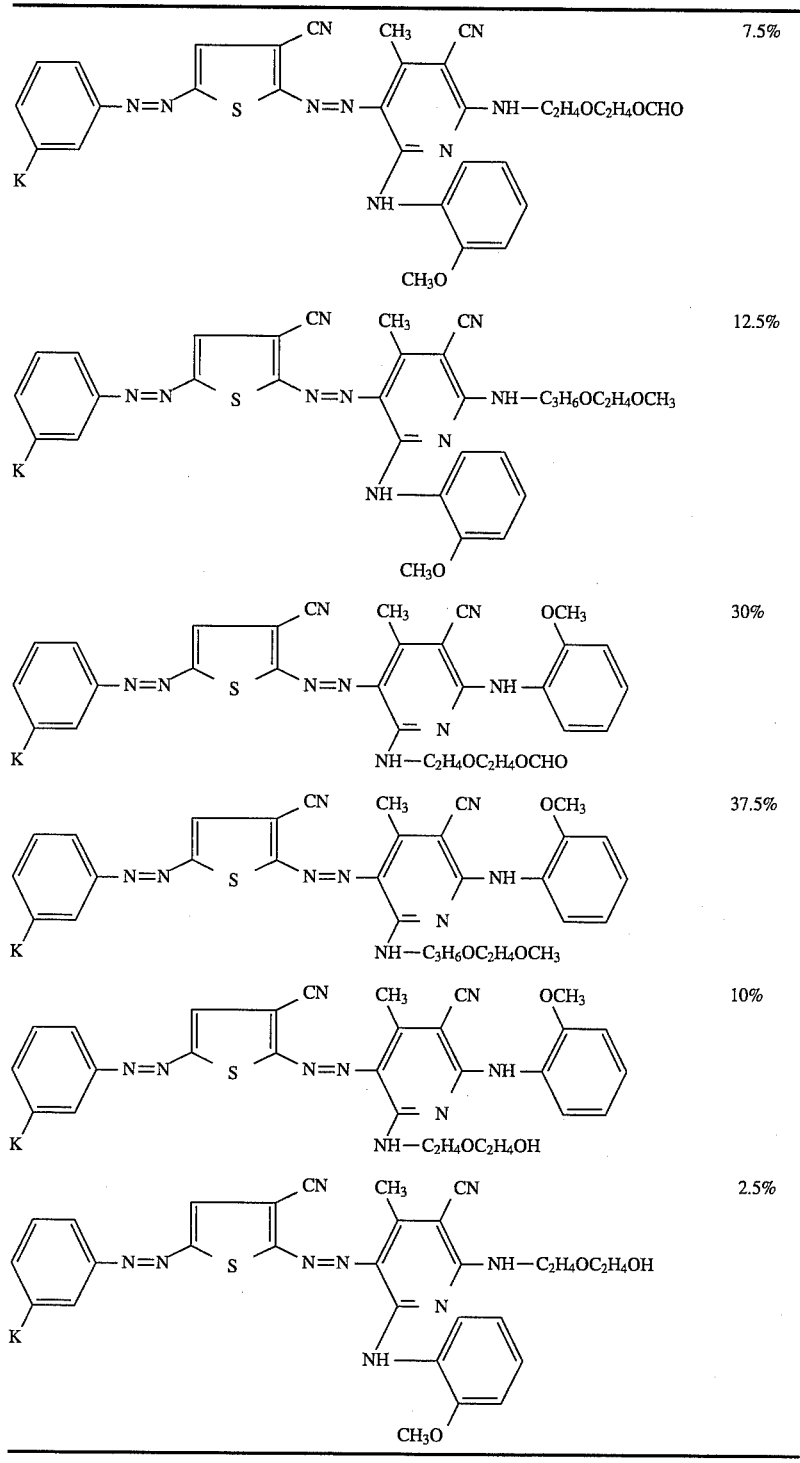
| | |
|---|---|
| | 7.5% |
| | 12.5% |
| | 30% |
| | 37.5% |
| | 10% |
| | 2.5% |
a) K=H
Hue on polyester: navy
b) K=CH₃
Hue on polyester: navy

TABLE 11

Mixture of 30% of dye of the formula A

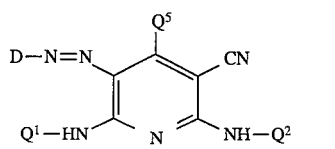
(A)

and 70% of dye of the formula B

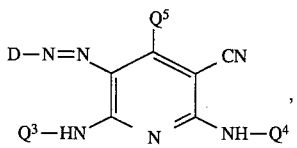
(B)

where $Q_1 = C_2H_4OW^1$ 80%  
$\quad\quad C_6H_5$ 20%  
$Q_3 = E-OW$ 80%  
$\quad\quad C_6H_5$ 20%  
$W = CHO$ 80%  
$\quad\quad H$ 20%  
($W^1$) or $CH_3$ ($W^2$)

$Q_2 = C_2H_4OW^1$ 20%  
$\quad\quad C_6H_5$ 80%  
$Q_4 = E-OW$ 20%  
$\quad\quad C_6H_5$ 80%

| Ex. No. | D | E—OW | $Q^5$ | Hue on polyester |
|---|---|---|---|---|
| 524 | CH₃OOC—[thiophene]—CN, CH₃OOC, CH₃ | $C_2H_4OC_2H_4OW^1$ | H | bluish red |
| 525 | CH₃OOC—[thiophene]—CN, CH₃OOC, CH₃ | $C_2H_4OC_2H_4OW^1$ | $CH_3$ | bluish red |
| 526 | C₂H₅OOC—[thiophene]—CN, C₂H₅OOC, CH₃ | $C_2H_4OC_2H_4OW^1$ | $CH_3$ | bluish red |
| 527 | C₂H₅OOC—[thiophene]—CN, C₂H₅OOC, CH₃ | $C_2H_4OC_2H_4OW^2$ | $CH_3$ | bluish red |
| 528 | C₂H₅OOC—[thiophene]—CN, C₂H₅OOC, CH₃ | $C_3H_6OC_4H_8OW^1$ | $CH_3$ | bluish red |
| 529 | CH₃OOC—[thiophene]—CN, CH₃OOC, CH₃ | $C_3H_6OC_4H_8OW^1$ | $CH_3$ | bluish red |

EXAMPLE 530

23.4 g of the compound of the formula

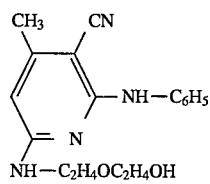

and 7.8 g of the compound of the formula

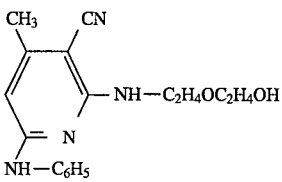

were stirred for 3 h in 100 g of glacial acetic acid and 0.5 g of sulfuric acid with evaporative cooling. Then acetic acid was distilled off under reduced pressure, and 75 ml of 85% strength by weight formic acid were added at about 50° C. The mixture was then cooled down, 0.8 g of 50% strength by weight sodium hydroxide solution was added, and the resulting solution was after addition of 0.3 g of an acidic dispersant used directly for coupling.

The reaction with conventionally diazotized diazo component (2.2 g) of formula

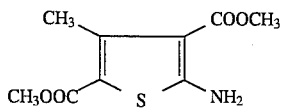

at pH <2 produced a mixture of the following dyes, which dyes polyester fabric in a fast red shade:

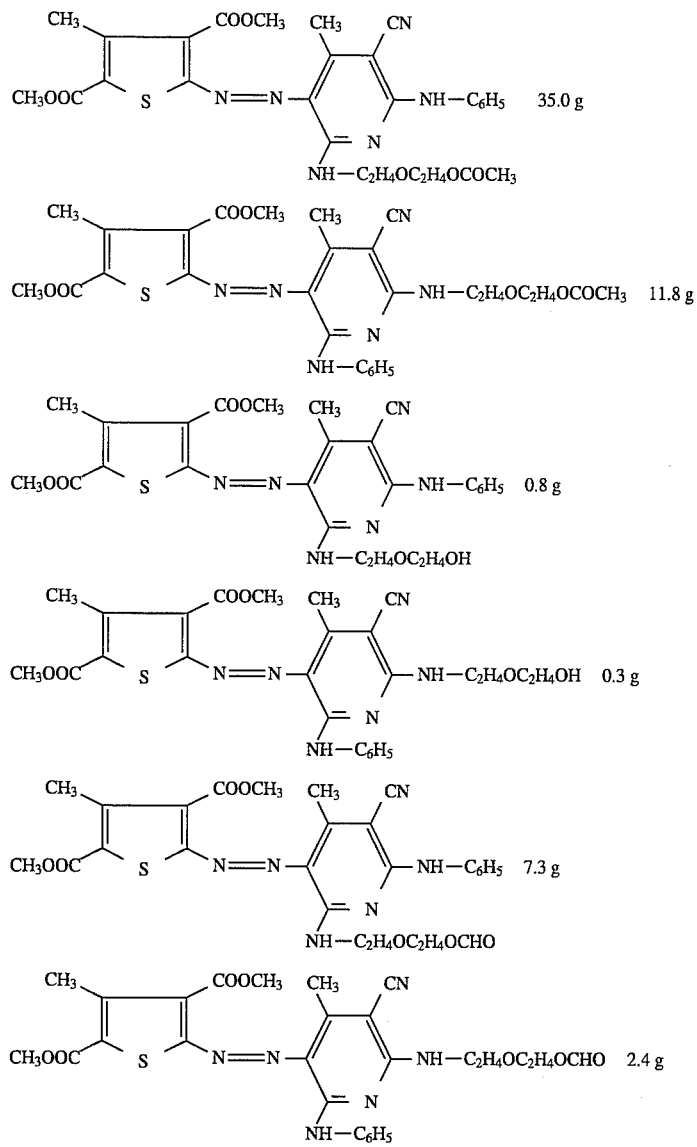

We claim:
1. A dye mixture, comprising at least four dyes of the same color having the formulae Ia and Ib:

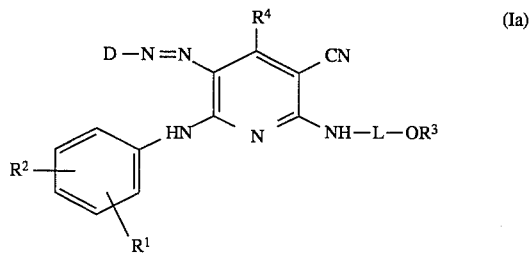

-continued

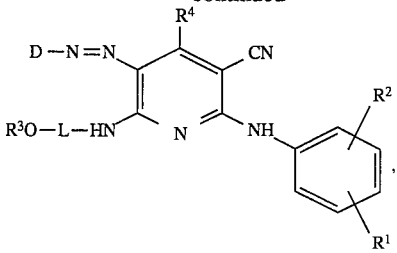

wherein:

D is a radical of a diazo component of aminoanthraquinone, aniline, aminothiophene, aminothiazole, aminoisothazole, aminothiodiazole or aminobenzoisothiazole;

L is $C_2$–$C_8$-alkylene, which is uninterrupted or interrupted by 1 or 2 oxygen atoms in an ether group;

$R^1$ and $R^2$ are independently of each other hydrogen, $C_1$–$C_4$-alkyl, $C_1$–$C_4$-alkoxy or halogen;

$R^3$ is hydrogen, $C_1$–$C_4$-alkyl or $C_1$–$C_3$-alkanoyl; and $R^4$ is hydrogen or $C_1$–$C_4$-alkyl.

2. A dye mixture as claimed in claim 1 wherein

D is 1-anthraquinonyl or a radical of the formula

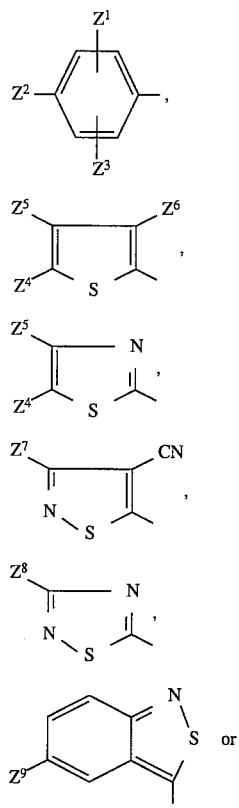

where $Z^1$ is hydrogen, nitro, cyano, chlorine, bromine, $C_1$–$C_4$-alkoxycarbonyl, phenylsulfonyl, phenoxysulfonyl or $C_1$–$C_4$-dialkylsulfamyl, $Z^2$ is hydrogen, nitro or unsubstituted or $C_1$–$C_4$-alkyl-, $C_1$–$C_4$-alkoxy- or chlorine-substituted phenylazo, $Z^3$ is hydrogen, cyano, chlorine, bromine, $C_1$–$C_4$-alkoxycarbonyl, phenylsulfonyl, phenoxysulfonyl or $C_1$–$C_4$-dialkylsulfamyl, $Z^4$ is cyano, formyl, $C_1$–$C_4$-alkoxycarbonyl, phenylcarbamoyl, unsubstituted or $C_1$–$C_4$-alkyl-substituted phenylazo or a radical of the formula

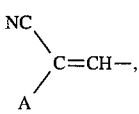

where A is cyano or $C_1$–$C_4$-alkoxycarbonyl, $Z^5$ is hydrogen, $C_1$–$C_4$-alkyl, $C_1$–$C_4$-alkoxy, phenyl which may be methyl-, methoxy-, chlorine- or $C_1$–$C_4$-alkoxycarbonyl-substituted, chlorine, bromine, $C_1$–$C_4$-alkoxycarbonyl or $Z^4$ and $Z^5$ together are an unsubstituted or methoxy-, thiocyanato- or $C_1$–$C_4$-alkylsulfonyl-substituted benzo radical, $Z^6$ is cyano or $C_1$–$C_4$-alkoxycarbonyl, $Z^7$ $C_1$–$C_4$-alkyl which may be $C_1$–$C_4$-alkoxy- or phenoxy-substituted, phenyl which may be methyl-, methoxy- or chlorine-substituted, benzyl which may be methyl-, methoxy- or chlorine-substituted, thienyl or cyano, $Z^8$ is phenyl or cyano- or $C_1$–$C_4$-alkoxycarbonyl-substituted ethylthio, $Z^9$ is hydrogen, nitro or cyano, and $Z^{10}$ is hydrogen, chlorine, bromine or cyano.

3. A dye mixture as claimed in claim 1 comprising from 4 to 8 dyes of the same color which have the formulae Ia and Ib.

4. A dye mixture as claimed in claim 1 wherein there are always present dyes of the formulae Ia and Ib where $R^3$ in both the formulae is at one and the same time hydrogen and $C_1$–$C_3$-alkanoyl.

5. A dye mixture as claimed in claim 1 wherein $R^4$ is methyl.

6. A dye mixture as claimed in claim 1 wherein $R^3$ is hydrogen, $C_1$–$C_4$-alkyl or $C_1$–$C_2$-alkanoyl and L is $C_3$–$C_8$-alkylene which is interrupted by 1 or 2 oxygen atoms in ether function.

7. A dye mixture as claimed in claim 1 wherein $R^3$ is hydrogen, $C_1$–$C_2$-alkyl or formyl.

8. Dye mixtures as claimed in claim 1 wherein $R^3$ is formyl or a mixture of formyl and acetyl in a molar ratio of from 1:9 to 9:1.

9. A dye mixtures as claimed in claim 2, wherein D is 1-anthraquinonyl or a radical of the formula IIa, IIb, IIc or IId.

10. A process for preparing the dye mixtures of claim 1, which comprises dissolving a mixture of the coupling components of the formulae IIIa and IIIb

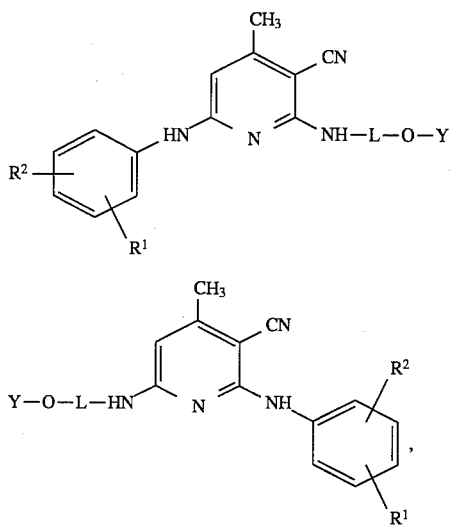

(IIIa)

(IIIb)

where L, R$^1$ and R$^2$ are each as defined in claim 1 and Y is in each case hydrogen or C$_1$–C$_4$-alkyl, in water-free or water-containing formic acid, acetic acid, propionic acid or a mixture thereof and treating this mixture with a diazonium salt derived from an amine of the formula IV $$D-NH_2 \qquad (IV)$$

where D is as defined in claim 1.

11. A process for dyeing or printing textile materials, which comprises dyeing or printing textiles with the dye mixture of claim 1.

12. The dye mixture as claimed in claim 1, wherein l is a (CH$_2$)$_2$, (CH$_2$)$_3$, (CH$_2$)$_2$O(CH$_2$)$_2$, (CH$_2$)$_2$O(CH$_2$)$_3$, (CH$_2$)$_3$O(CH$_2$)$_3$, (CH$_2$)$_3$O(CH$_2$)$_4$ or (CH$_2$)$_3$O(CH$_2$)$_2$O(CH$_2$)$_2$.

13. The dye mixture as claimed in claim 1, which comprises from 10 to 35% by weight of one or more dyes of the formula Ia and from 65 to 90% by weight of one or more dyes of the formula Ib.

14. The dye mixture as claimed in claim 13, which comprises from 15 to 30% by weight of one or more dyes of the formula Ia and from 70 to 85% by weight of one or more dyes of the formula Ib.

* * * * *